(12) United States Patent
Hasegawa et al.

(10) Patent No.: US 6,797,081 B2
(45) Date of Patent: Sep. 28, 2004

(54) CENTRIFUGAL CASTING METHOD, CENTRIFUGAL CASTING APPARATUS, AND CAST ALLOY PRODUCED BY SAME

(75) Inventors: Hiroshi Hasegawa, Chichibu (JP); Masahide Utsunomiya, Chichibu (JP); Uremu Hosono, Chichibu (JP); Yoichi Hirose, Chichibu (JP)

(73) Assignee: Showa Denko K.K., Tokyo (JP)

( * ) Notice: Subject to any disclaimer, the term of this patent is extended or adjusted under 35 U.S.C. 154(b) by 102 days.

(21) Appl. No.: 10/111,634

(22) PCT Filed: Aug. 31, 2001

(86) PCT No.: PCT/JP01/07535

§ 371 (c)(1),
(2), (4) Date: Apr. 26, 2002

(87) PCT Pub. No.: WO02/18078

PCT Pub. Date: Mar. 7, 2002

(65) Prior Publication Data

US 2002/0153062 A1 Oct. 24, 2002

Related U.S. Application Data

(60) Provisional application No. 60/234,350, filed on Sep. 22, 2000, and provisional application No. 60/263,239, filed on Jan. 23, 2001.

(30) Foreign Application Priority Data

Aug. 31, 2000 (JP) ........................................ 2000-262605
Feb. 1, 2001 (JP) ........................................ 2001-025340

(51) Int. Cl.[7] .............................................. B22D 13/00
(52) U.S. Cl. ........................ 148/539; 148/101; 164/114; 164/116; 164/286; 164/298
(58) Field of Search ................................. 164/114, 116, 164/286, 298; 148/539, 101, 105, 301, 302, 303; 252/62, 54, 62.55; 75/255, 254, 244, 245

(56) References Cited

U.S. PATENT DOCUMENTS

| 4,921,553 | A | * | 5/1990 | Tokunga et al. ............ 148/302 |
| 4,975,213 | A | * | 12/1990 | Sakai et al. ............... 252/62.53 |
| 5,156,818 | A | * | 10/1992 | Manchak et al. ............ 422/159 |
| 5,228,930 | A | * | 7/1993 | Nakayama et al. ......... 148/302 |
| 5,725,042 | A | | 3/1998 | Hirose et al. |
| 5,948,179 | A | | 9/1999 | Hasegawa et al. |
| 6,045,629 | A | | 4/2000 | Hasegawa et al. |

FOREIGN PATENT DOCUMENTS

| EP | 0 784 350 | | 7/1997 | |
| JP | 57-91863 | * | 6/1982 | ................. 164/116 |
| JP | 5-222488 | | 8/1993 | |

(List continued on next page.)

OTHER PUBLICATIONS

Hirose, Y. et al., "Microstructure of Strip Case Alloys for High Performance NdFeB Magnets", Proceedings of the 15th International Workshop on Rare–Earth Magnets and Their applications, vol. 1, pp. 77–86 (1998).

Primary Examiner—John P Sheehan
(74) Attorney, Agent, or Firm—Sughrue Mion, PLLC

(57) ABSTRACT

The present invention relates to a casting method which employs rapid solidification of metal, rare-earth metal or the like, as well as to a casting apparatus and a cast alloy. A centrifugal casting method includes the steps of pouring a molten material onto a rotary body; sprinkling the molten material by the effect of rotation of the rotary body; and causing the sprinkled molten material to be deposited and to solidify on the inner surface of a rotating cylindrical mold. The axis of rotation of the rotary body and the axis of rotation of the cylindrical mold are caused not to run parallel to each other. The centrifugal casting method can attain a decrease in average deposition rate. As a result, generation of the dendritic αFe phase or generation of a segregation phase of Mn or the like is suppressed, thereby realizing a high-performance R-T-B-type rare-earth magnet alloy.

55 Claims, 9 Drawing Sheets

FOREIGN PATENT DOCUMENTS

| | | | | |
|---|---|---|---|---|
| JP | 5-295490 | 11/1993 | | |
| JP | 5-320792 | 12/1993 | | |
| JP | 6-236806 | * 8/1994 | ............. | 252/62.54 |
| JP | 8-13078 | 1/1996 | | |
| JP | 8-296005 | 11/1996 | | |
| JP | 8-332557 | 12/1996 | | |
| JP | 9-31609 | 2/1997 | | |
| JP | 9-170055 | 6/1997 | | |
| JP | 9-180716 | 7/1997 | | |
| JP | 10-36949 | 2/1998 | | |
| JP | 11-90603 | 4/1999 | | |
| JP | 11-297519 | 10/1999 | | |

* cited by examiner

PRIOR ART

CENTRIFUGAL CASTING METHOD, CENTRIFUGAL CASTING APPARATUS, AND CAST ALLOY PRODUCED BY SAME

CROSS-REFERENCE TO RELATED APPLICATIONS

This application claims the benefit pursuant to 35 U.S.C. §119(e)(1) of U.S. Provisional Applications No. 60/234,350 filed Sep. 22, 2000 and No. 60/263,239 filed Jan. 23, 2001.

TECHNICAL FIELD

The present invention relates to a casting method which employs rapid solidification of metal, rare-earth metal, high-melting-point metal, nonmetal or the like, as well as to a casting apparatus and a cast alloy.

BACKGROUND ART

In recent years, as peripheral equipment for personal computers—such as HDDs (hard disk drives)—AV equipment, household electric equipment, and the like have become lightweight, compact, and of higher performance, demand for sintered rare-earth magnets represented by Nd-based (neodymium-based) magnets has sharply increased. Typical alloys for such magnets are the Nd—Fe—B-type alloys, which additionally contain iron and boron and are typified by a composition $Nd_2Fe_{14}B$.

In many of these rare-earth magnets, in order to improve magnetic properties, to enhance economical efficiency through effective use of rare-earth elements, which are limited resources, and to enhance use-related properties (such as heat resistance and corrosion resistance), Dy (dysprosium), Pr (praseodymium), or similar rare-earth elements are incorporated so as to substitute for some portion of Nd, and Co, Al, Cu, or like elements are incorporated so as to substitute for some portion of Fe.

When there is no particular reason to limit a rare-earth element contained in rare-earth magnets including those mentioned above to Nd, the rare-earth magnets are collectively referred to as R-T-B-type magnets (R: rare-earth element; T: transition metal element).

Generally, all industrially produced R-T-B-type magnets contain R in an amount slightly exceeding the stoichiometric amount for the composition $R_2T_{14}B$. Thus, in a magnet alloy ingot, a phase which contains a rare-earth element(s), represented by R, at high concentration (hereinafter called the R-rich phase) is generated.

The R-rich phase is known to play the following important roles in R-T-B-type magnets.
(1) Since melting point of the R-rich phase is low, the phase becomes a liquid phase during sintering in a magnet production step, thereby contributing to achievement of high density of the resultant magnet and thus to improvement in remanence.
(2) The R-rich phase functions to smoothen grain boundaries, thereby reducing the number of nucleation sites in a reversed magnetic domain. Moreover, being nonmagnetic, the R-rich phase magnetically insulates the main phase, thereby enhancing the coercivity.
(3) Since the R-rich phase expands through absorption of hydrogen, this feature is utilized for decrepitating an ingot into pieces. Specifically, the R-rich phase is caused to absorb hydrogen so as to expand. As a result, cracks are generated within an alloy ingot, thereby decrepitating the ingot into pieces. The R-rich phase serves as a starting point of so-called hydrogen decrepitation.

In recent years, R-T-B-type magnets of improved magnetic characteristics, particularly R-T-B-type magnets of enhanced maximum magnetic energy product (BHmax), have been developed. In order to obtain such a high-performance magnet, the percentage of the $R_2T_{14}B$ phase (hereinafter called the T1 phase), which produces magnetism, must be increased, and the R-rich phase must be reduced. In order to fulfill these needs, the total rare-earth element content (hereinafter called the TRE content) must be reduced so as to attain a near stoichiometric composition.

In such a case, the following problems that affect magnetic properties of the produced magnets are involved in alloy production steps and magnet production steps.

First, in melting and casting of an alloy; for example, a ternary alloy of Nd—Fe—B, the T1 phase forms through peritectic reaction between a primary γFe phase and a liquid phase. Thus, as the TRE content (the total R content) decreases, an αFe phase, which is a transformed form of γFe, tends to form. The αFe phase appears in the form of dendrites and extends three-dimensionally within the alloy, thereby significantly deteriorating crushability of the alloy in the magnet production step.

Second, when the TRE content is decreased, the percentage of the existing R-rich phase decreases. Thus, the aforementioned effects exerted by the R-rich phase; i.e., achievement of high density of the resultant magnet and enhancement in coercivity to a magnet, cannot be expected.

In order to solve the above problems, a strip casting process (SC process) has been developed (see, for example, Japanese Patent Application Laid-Open (kokai) Nos. 5-222488 and 5-295490). According to the SC process, a molten alloy is poured onto a water-cooled rotating roller of copper through a tundish and solidifies upon contact with the roll, so as to continuously produce a strip-like ingot. Subsequently, the strip-like ingot is crushed coarsely, and ultimately into flakes.

When an R-T-B-type rare-earth magnet alloy is cast by the SC process, very thin flakes, each having a thickness of about 0.2 mm to 0.4 mm, can be obtained, and therefore, cooling for solidification can be high. Thus, the molten metal can be cooled below a co-existence region of a liquid phase and γFe. That is, the T1 phase forms directly without formation of γFe. For example, a ternary alloy of Nd—Fe—B can be cast without formation of dendritic αFe while the Nd content ranges down to about 12.7 at. % (28.5% by mass), at which Nd content a high-performance magnet of 400 kJ/m³ or higher can be produced. (Y. Hirose, H. Hasegawa, S. Sasaki and M. Sagawa, Proceedings of the 15th International Workshop on Rare-Earth Magnets and Their Applications, Volume 1, pages 77–86, 30 Aug.–3 Sep. 1998, Dresden, Germany).

Because of high rate of solidification, an alloy cast by the SC process has a relatively small crystal grain size of 20 μm to 30 μm as measured along the short axis. FIG. 7 schematically shows a cross-sectional structure of an R-T-B rare-earth alloy cast by the SC process and having an R content of 11.8 at. % (26.5% by mass) or more. In FIG. 7, the bottom surface (called the mold contact surface) is the surface of an ingot in contact with a mold, and the top surface (called the free surface) is opposite the mold contact surface.

Excess R over the stoichiometric amount in the composition $R_2T_{14}B$ is diffused out from the solidification interface during solidification, thereby generating lamellar R-rich phases 30 arranged at intervals of 3 μm to 10 μm. The R-rich phases 30 form on the grain boundaries 28 of and within a crystal grain 29. As compared with a conventional alloy cast by means of a book-mold, the R-rich phases 30 are distributed finely and uniformly. Thus, crushability during hydrogen decrepitation is significantly improved, such that pulverized particles attain a size which is a fraction of the crystal grain size. That is, it is possible to obtain a powder constituted solely by single-crystal particles. A region denoted by reference numeral 32 is the T1 phase.

A powder consisting of single-crystal particles facilitates, in a later step of compaction in a magnetic field, formation of a compact which is oriented in the direction of the C-axis, which serves as an easy-magnetization axis.

However, mere mechanical pulverization disintegration without involvement of hydrogen decrepitation causes cracking to propagate through grains (i.e., penetrating grains) in the form of cleavage fracture without utilization of the R-rich phases generated on grain boundaries and within grains. As a result, among pulverized particles, an increased number of particles come to have crystal grain boundaries 28, or in other words, are not single crystal particles. Accordingly, the degree of alignment drops at the time of compaction in a magnetic field, causing an impairment in magnetization and a decrease in magnetic energy product after sintering.

The present inventors devised another rapid solidification process and an apparatus therefor (Japanese Patent Application Laid-Open (kokai) Nos. 08-13078 and 08-332557). Specifically, a molten material is introduced into a rotating mold via a box-like tundish, which is disposed in a reciprocative manner inside the mold and has a plurality of nozzles, whereby the molten material is deposited and solidifies on the inner surface of the rotating mold (CC (Centrifugal Casting) process).

In the CC process, a molten material is continuously poured onto an ingot which has already been deposited and solidified. The additionally cast molten material solidifies while the mold makes one rotation; thus, the rate of solidification can be increased. The newly poured molten material and the surface of the existing solidified ingot fuse together, whereby crystals grow epitaxially. Thus, the CC process can produce an alloy whose crystal grain size is several times longer than that of an alloy produced by the SC process.

However, in the production of an alloy of low R content, in contrast to the SC process, the CC process unavoidably involves formation of dendritic αFe due to low cooling rate in a high-temperature zone. For example, in production of a ternary alloy of Nd—Fe—B, formation of dendritic αFe is observed at an Nd content of about 14.4 at. % (31.5% by mass) or less, which is not observed in the SC process.

When the deposition rate of a molten material is decreased in order to increase the solidification-cooling rate in the CC process, the temperature of the solidified ingot drops, thereby increasing the temperature-dropping rate of the deposit layer of the additional molten material, leading to an increase in the solidification-cooling rate. However, decreasing the deposition rate in the CC process involves the following problems.

(1) Since the deposition rate is a value obtained by dividing the amount of supply (volume of supply) of a molten material per unit time by an effective inner surface area of a mold, the effective area of a mold may be increased. Specifically, a mold of large inside diameter or long length relative to the amount of the material to be cast may be used. However, this causes an increase in equipment scale, requiring a larger chamber. Also, the consumption of inert gas increases. Thus, economical efficiency becomes low.

(2) In order to decrease the deposition rate through decrease in the amount of supply of a molten material, the head of the molten material contained in a tundish must be lowered. In this case, the supply of the molten material becomes nonuniform, causing difficulty in obtaining an ingot of uniform thickness in the longitudinal direction of the mold. Accordingly, the deposition rate of the molten material varies in the longitudinal direction, resulting in nonuniform microstructure of ingot.

(3) When the amount of supply of a molten material is decreased, the temperature of the molten material contained in a tundish drops significantly, causing difficulty in performing stable casting.

(4) When the deposition rate is decreased, a rough surface of ingots tends to form, thus reducing commercial value.

The foregoing discussion is directed to R-T-B-type rare-earth magnet alloys. In recent years, demand for hydrogen storage mischmetal-nickel alloys has increased for use as materials for negative electrodes of nickel-hydride batteries, which are a type of secondary batteries. But regrettably, the hydrogen storage alloys also involve similar problems.

An intermetallic compound which serves as an important component of a hydrogen storage mischmetal-nickel alloy is a compound assuming an $M_1T_5$ phase, which contains a mischmetal M, which is a mixture of rare-earth elements, such as Ce, La, Nd, and Pr; and a transition metal T, which includes Ni as a fundamental element, at the ratio 1:5.

The transition metal T includes Ni as a main element as well as additional elements, such as Co, Al, Mn, and Cu, in order to adjust the equilibrium pressure associated with absorption and desorption of hydrogen and to improve catalytic characteristics in application to negative electrodes and various characteristics in application to batteries, such as charge-discharge cycle characteristics.

The $M_1T_5$ phase does not involve the problem of dendritic αFe formation, but, in casting through use of an ordinary book mold, involves the problem that Mn of added elements segregates, causing impairment in charge-discharge cycle characteristics. Thus, as in the case of magnet alloys, a rapid quench method and the SC process are proposed for production of hydrogen storage mischmetal-nickel alloy (Japanese Patent Application Laid-Open (kokai) No. 05-320792).

However, the proposed rapid cooling method involves the problem that residual strain tends to be locked in an ingot, causing impairment in hydrogen storage characteristics.

The present inventors also devised a method for producing hydrogen storage mischmetal-nickel alloys (Japanese Patent Application Laid-Open (kokai) No. 09-180716), making use of the CC process. However, the CC process unavoidably involves segregation of Mn due to slow solidification-cooling rate. A difficulty arises in uniformly melting any of metals of high melting point, such as Ti, Mo, Nb, V, W, Ta, and Cr, and alloys and intermetallic compounds which contain the metal(s).

DISCLOSURE OF INVENTION

An object of the present invention is to solve the above-mentioned problems and to provide a casting method and a casting apparatus featuring a solidification-cooling rate higher than that of the conventional CC process. Another object of the invention is to provide, by the casting method, a high-performance R-T-B-type rare-earth magnet alloy, a high-performance hydrogen storage mischmetal-nickel alloy, or the like while formation of the dendritic αFe phase or formation of a segregation phase of Mn or the like is suppressed. A further object of the invention is to provide a casting method and a casting apparatus for producing an alloy which contains a metal of high melting point, such as Ti, Mo, Nb, V, W, Ta, Cr, or the like, which involves difficulty in casting.

The present inventors conducted extensive studies in an attempt to solve the aforementioned problems, and as a result have attained the present invention.

A centrifugal casting method according to the present invention comprises the steps of pouring a molten material onto a rotary body; sprinkling the molten material by the effect of rotation of the rotary body; and causing the sprinkled molten material to be deposited and to solidify on the inner surface of a rotating cylindrical mold. The axis of rotation R of the rotary body and the axis of rotation L of the cylindrical mold are caused not to run parallel to each other.

Preferably, the rotary body assumes the form of a container having a bottom portion and a sidewall; the sidewall has a hole portion formed therein; and the molten material is poured into an opening portion of the container-like rotary body to thereby sprinkle the molten material through the hole portion.

Preferably, the rotary body and the cylindrical mold rotate in the same direction.

Another centrifugal casting method according to the present invention comprises the steps of melting a metal-containing material body through application of heat while rotating the material body; sprinkling the molten material by the effect of rotation; and causing the sprinkled molten material to be deposited and to solidify on the inner surface of a rotating cylindrical mold. The axis of rotation R of the metal-containing material body and the axis of rotation L of the cylindrical mold are caused not to run parallel to each other.

Preferably, the metal-containing material body and the cylindrical mold rotate in the same direction.

In these centrifugal casting methods, preferably the molten material is subjected to a force of not less than 1 G induced by rotation of the rotary body.

Further preferably, in these centrifugal casting methods, the molten material is subjected to a force of not less than 3 G induced by rotation of the cylindrical mold.

Preferably, the angle of inclination $\theta$ formed by the axis of rotation R of the rotary body and the axis of rotation L of the cylindrical mold ranges from 5 degrees to 40 degrees.

Preferably, the angle of inclination $\theta$ formed by the axis of rotation R of the metal-containing material body and the axis of rotation L of the cylindrical mold ranges from 5 degrees to 40 degrees.

Preferably, when the molten material is caused to be deposited and to solidify on the inner wall of the cylindrical mold, average deposition rate is not greater than 0.015 cm/sec.

More preferably, when the molten material is caused to be deposited and to solidify on the inner wall of the cylindrical mold, average deposition rate is not greater than 0.010 cm/sec.

Most preferably, when the molten material is caused to be deposited and to solidify on the inner wall of the cylindrical mold, average deposition rate is not greater than 0.005 cm/sec.

Preferably, when the molten material is deposited and solidifies on the inner wall of the cylindrical mold, the average surface temperature of an ingot is 0.4T to 0.8T, wherein T (K) is the solidification starting temperature of the molten material.

A centrifugal casting apparatus according to the present invention comprises a rotatable cylindrical mold; a rotary body disposed within the cylindrical mold; and a supply apparatus for pouring a molten material onto the rotary body. The rotary body is disposed such that the axis of rotation L of the cylindrical mold and the axis of rotation R of the rotary body do not run parallel to each other. The molten material poured onto the rotary body is sprinkled by the effect of rotation of the rotary body and is caused to be deposited and to solidify on the inner wall of the cylindrical mold.

Another centrifugal casting apparatus according to the present invention comprises a rotatable cylindrical mold; a rotation drive mechanism to which a metal-containing material body is attached such that at least an end of the metal-containing material body is located within the cylindrical mold and which is adapted to rotate the metal-containing material body; and a melting apparatus for melting the metal-containing material body through generation of arc or plasma arc. The axis of rotation L of the cylindrical mold and the axis of rotation R of the metal-containing material body are caused not to run parallel to each other. The molten metal-containing material is sprinkled by the effect of rotation of the metal-containing material body and is caused to be deposited and to solidify on the inner wall of the cylindrical mold.

These centrifugal casting apparatuses are preferably such that the angle of inclination $\theta$ formed by the axis of rotation L of the cylindrical mold and the axis of rotation R of the rotary body or the angle of inclination $\theta$ formed by the axis of rotation L of the cylindrical mold and the axis of rotation R of the metal-containing material body can be varied during deposition of the molten material.

These centrifugal casting apparatuses are preferably such that the cylindrical mold and/or the rotary body, or the cylindrical mold and/or the metal-containing material body, can be reciprocated along the axis of rotation L during deposition of the molten material.

The centrifugal casting method of the present invention is preferably such that the angle of inclination $\theta$ formed by the axis of rotation L of the cylindrical mold and the axis of rotation R of the rotary body, or the angle of inclination $\theta$ formed by the axis of rotation L of the cylindrical mold and the axis of rotation R of the metal-containing material body, is varied during deposition of the molten material.

Preferably, the cylindrical mold and/or the rotary body is reciprocated along the axis of rotation L during deposition of the molten material.

Preferably, the cylindrical mold and/or the metal-containing material body is reciprocated along the axis of rotation L during deposition of the molten material.

The centrifugal casting method of the present invention is suited for casting a rare-earth magnet alloy.

Preferably, the rare-earth magnet alloy contains as rare-earth elements one or more elements selected from among Nd, Pr, and Dy.

Particularly preferably, the rare-earth magnet alloy contains one or more elements selected from among Nd, Pr, and Dy in a total amount of 11.0 at. % to 15.2 at. %.

Further preferably, the rare-earth magnet alloy contains one or more elements selected from among Nd, Pr, and Dy in a total amount of 11.8 at. % to 14.4 at. %.

Most preferably, the rare-earth magnet alloy contains one or more elements selected from among Nd, Pr, and Dy in a total amount of 11.8 at. % to 13.5 at. %.

The present invention is suited for casting an R-T-B-type rare-earth magnet alloy (R: rare-earth elements including at least one or more elements selected from among Nd, Pr, and Dy; and T: transition metals including Fe).

A rare-earth magnet alloy can be produced by heat-treating, at a temperature ranging from 900° C. to 1,150° C., a rare-earth magnet alloy obtained by the centrifugal casting method of the present invention.

A rare-earth magnet alloy powder can be produced by pulverizing a rare-earth magnet alloy obtained by the centrifugal casting method of the present invention or by heat-treating the rare-earth magnet alloy at a temperature ranging from 900° C. to 1,150° C., followed by pulverization.

A sintered magnet can be produced from the thus-obtained rare-earth magnet alloy powder.

A magnet powder for use in an anisotropic bonded magnet can be produced by subjecting the thus-obtained rare-earth magnet alloy powder to an HDDR treatment.

An anisotropic bonded magnet can be produced from this magnet powder for use in an anisotropic bonded magnet.

The present invention provides a rare-earth magnet alloy which is obtained through casting, characterized by containing one or more elements selected from among Nd, Pr, and Dy in a total amount of 11.0 at. % to 15.2 at. % and characterized in that, when determined in an as-cast state of the alloy, a microstructure containing the dendritic αFe phase occupies an area percentage of not greater than 10% as measured on a cross section of a cast product taken along a thickness direction and that the cast product assumes a thickness of 3 mm to 30 mm.

The present invention provides a rare-earth magnet alloy which is obtained through casting, characterized by containing one or more elements selected from among Nd, Pr, and Dy in a total amount of 11.0 at. % to 15.2 at. % and characterized in that, when determined in an as-cast state of the alloy, a microstructure containing dendritic αFe occupies an area percentage of not greater than 10% as measured on a cross section of a cast product taken along a thickness direction and that crystal grains having a diameter of not less than 1,000 μm as measured along a long axis occupy an area percentage of 10% to 98% as measured on the cross section.

The present invention provides an R-T-B-type rare-earth magnet alloy which is obtained through casting, characterized in that, when determined in an as-cast state of the alloy, a microstructure containing the dendritic αFe phase occupies an area percentage of not greater than 10% as measured on a cross section of a cast product taken along a thickness direction and that the cast product assumes a thickness of 3 mm to 30 mm.

The present invention provides an R-T-B-type rare-earth magnet alloy which is obtained through casting, characterized in that, when determined in an as-cast state of the alloy, a microstructure containing dendritic αFe occupies an area percentage of not greater than 10% as measured on a cross section of a cast product taken along a thickness direction and that crystal grains having a diameter of not less than 1,000 μm as measured along a long axis occupy an area percentage of 10% to 98% as measured on the cross section.

The present invention provides a rare-earth magnet alloy which is obtained through casting, characterized by containing one or more elements selected from among Nd, Pr, and Dy in a total amount of 11.0 at. % to 15.2 at. % and characterized in that, when determined in an as-cast state of the alloy, the dendritic αFe phase is substantially absent as observed on a cross section of a cast product taken along a thickness direction and that the cast product assumes a thickness of 3 mm to 30 mm.

The present invention provides a rare-earth magnet alloy which is obtained through casting, characterized by containing one or more elements selected from among Nd, Pr, and Dy in a total amount of 11.0 at. % to 15.2 at. % and characterized in that, when determined in an as-cast state of the alloy, the dendritic αFe is substantially absent as observed on a cross section of a cast product taken along a thickness direction; crystal grains having a diameter of not less than 1,000 μm as measured along a long axis occupy an area percentage of 50% to 98% as measured on the cross section; and the cast product assumes a thickness of 3 mm to 30 mm.

The present invention provides a rare-earth magnet alloy which is obtained through casting, characterized by containing one or more elements selected from among Nd, Pr, and Dy in a total amount of 11.0 at. % to 15.2 at. % and characterized in that, when determined in an as-cast state of the alloy, the dendritic αFe is substantially absent as observed on a cross section of a cast product taken along a thickness direction; as measured on the cross section, crystal grains having a diameter of not less than 1,000 μm as measured along a long axis occupy an area percentage of 50% to 98% and crystal grains assume an average diameter of not less than 60 μm as measured along a short axis; and the cast product assumes a thickness of 3 mm to 30 mm.

These rare-earth magnet alloys are preferably such that one or more elements selected from among Nd, Pr, and Dy are contained in a total amount of 11.8 at. % to 14.4 at. %.

These rare-earth magnet alloys are more preferably such that one or more elements selected from among Nd, Pr, and Dy are contained in a total amount of 11.8 at. % to 13.5 at. %.

These rare-earth magnet alloys are preferably such that a cast product assumes a thickness of 5 mm to 20 mm.

The present invention is suited for casting a rare-earth hydrogen storage alloy.

The rare-earth hydrogen storage alloy is preferably a mischmetal-nickel alloy.

Preferably, a metal, an alloy, or an intermetallic compound to be cast has a melting point or a solidification starting temperature of 1400° C. or higher.

A metal, an alloy, or an intermetallic compound containing Ti can be cast.

Preferably, the above-mentioned rare-earth magnet alloy serves as a main-phase alloy for use in production of a rare-earth magnet by a two-alloy blending method.

A rare-earth magnet powder is preferably such that the above-mentioned rare-earth magnet alloy powder serves as a main-phase alloy powder for use in production of a rare-earth magnet by a two-alloy blending method.

A sintered magnet is produced from the above-mentioned rare-earth magnet alloy.

Particularly, a sintered magnet is produced through blending of a main-phase alloy powder comprising the above-mentioned rare-earth magnet powder; and a boundary-phase alloy powder containing Nd, Pr, and Dy in a total amount greater than that of Nd, Pr, and Dy contained in the main-phase alloy powder.

BEST MODE FOR CARRYING OUT THE INVENTION

Figure 1:
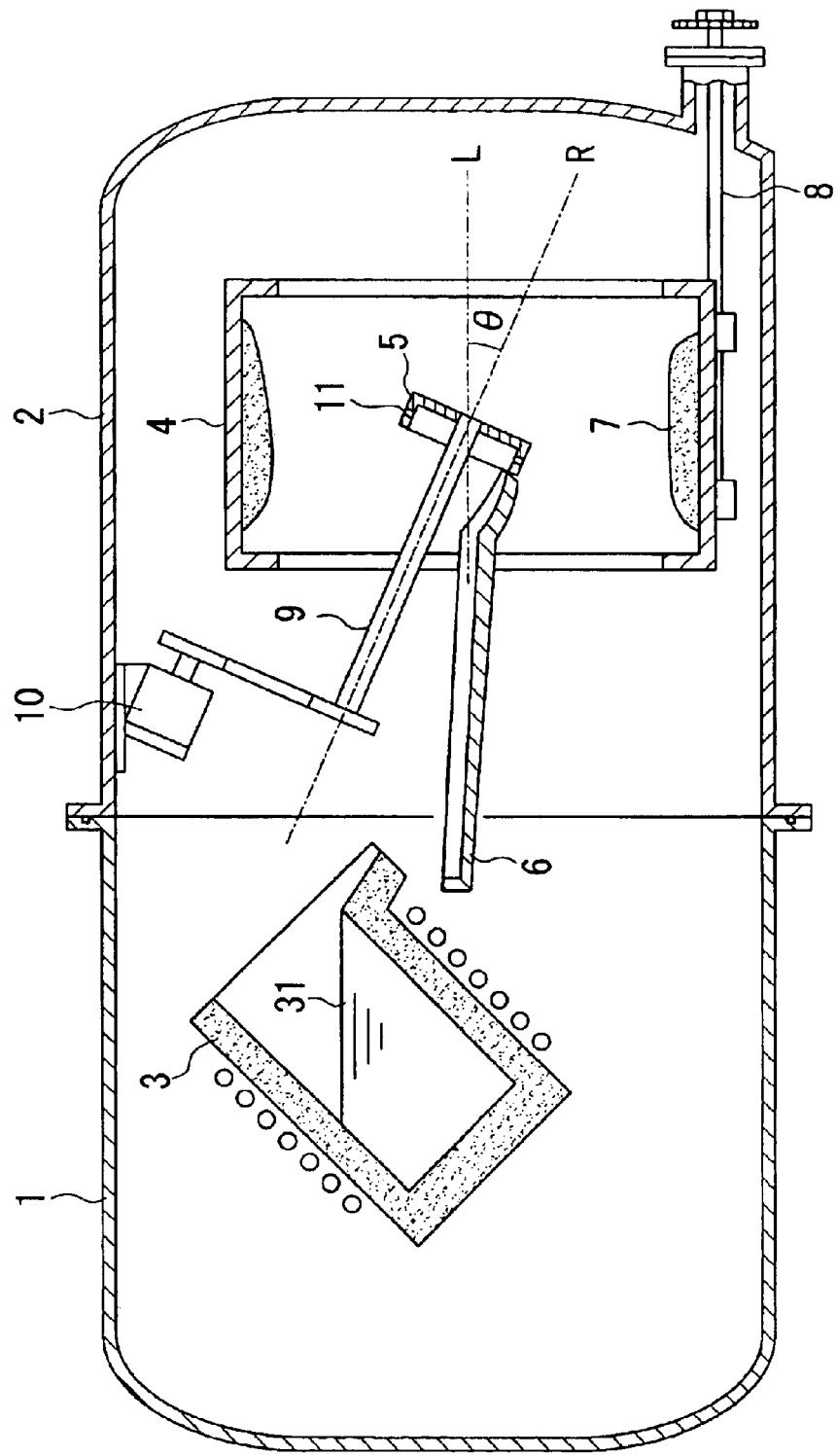
FIG. 1 is a longitudinal sectional view showing an example of a casting apparatus of the present invention.

A centrifugal casting method according to the present invention comprises the steps of receiving a molten material by means of a rotary body (reference letter R represents the axis of rotation of the rotary body); sprinkling the molten material by the effect of rotation of the rotary body; and causing the sprinkled molten material to be deposited and to solidify on the inner surface of a rotating cylindrical mold (reference letter L represents the axis of rotation of the cylindrical mold), thereby producing an ingot from the molten material. In the centrifugal casting method, the angle of inclination θ formed by the axis of rotation R and the axis of rotation L are caused not to assume 0; i.e., the axis of rotation R and the axis of rotation L is caused not to run parallel to each other.

A centrifugal casting apparatus for carrying out the method will next be described with reference to FIG. 1.

The illustrated centrifugal casting apparatus is configured such that a melting chamber 1 and a casting chamber 2 are connected to thereby establish a sealed enclosure. A crucible 3 is disposed within the melting chamber 1, and a cylindrical mold 4 is disposed within the casting chamber 2.

The crucible 3 is adapted to melt a metal, an alloy, an intermetallic compound, or the like into a liquid material through application of heat, thereby yielding a molten material 31. Examples of melting processes include resistance heating, induction heating, arc melting, and plasma arc melting. Melting is performed in, for example, the atmosphere, vacuum, or an inert gas. The centrifugal casting method of the present invention is particularly suited for casting a substance containing a rare-earth element and a metal of high melting point. A melting process suitable to this case is radio frequency induction heating in vacuum or an inert gas or plasma heating. An inert gas to be used is usually argon gas. When cooling rate is to be increased, helium gas is preferred because of high thermal conductivity. When plasma arc melting is to be employed, preferably, an inert gas is used in combination with hydrogen gas since melting energy can be increased.

The cylindrical mold 4 is disposed within the casting chamber 2 in such a manner as to be rotatable about the axis of rotation L. In the illustrated example, a mold drive mechanism 8 is connected to the outer cylindrical surface of the cylindrical mold 4, so that the cylindrical mold 4 is rotated according to a rotating drive force of the mold drive mechanism 8. A through-hole is formed in one side wall of the cylindrical mold 4 so as to allow insertion of a molten-material supply apparatus, which will be described later.

A rotary body 5 is disposed within the cylindrical mold 4. The supply apparatus for pouring a molten material from the crucible 3 onto the rotary body 5 extends from the melting chamber 1 to the casting chamber 2. In the example of FIG. 1, the supply apparatus assumes the form of a trough 6 for leading a molten material into the rotary body 5 in a flowing condition.

A rotary-body drive mechanism 9 is connected to the rotary body 5 in such a manner as to be rotatable about the axis of rotation R. Specifically, a drive motor 10 provided on the rotary-body drive mechanism 9 generates a drive force, which is transmitted to the rotary body 5, thereby rotating the rotary body 5. The molten material 31 poured onto the rotary body 5 is sprinkled by the effect of rotation of the rotary body 5. The sprinkled molten material 31 is caused to be deposited and to solidify on the inner wall of the cylindrical mold 4 to thereby be formed into an ingot 7.

In the example of FIG. 1, rotary-body drive mechanism 9 is connected to the rotary body 5 from the same side as the trough 6. However, the present invention is not limited thereto. For example, through-holes may be formed in the two respective side walls of the cylindrical mold 4 so as to connect the rotary-body drive mechanism 9 to the rotary body 5 from the side opposite the trough 6.

Figure 2A:
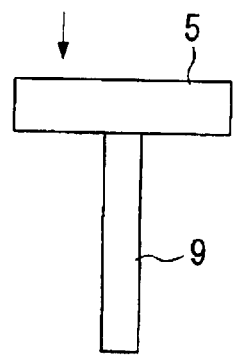
FIGS. 2(a) to 2(c) are each a side view showing an example of a rotary body.
Figure 2B:
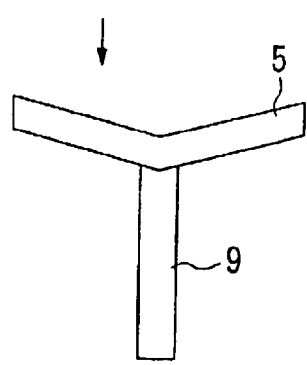
Figure 2C:
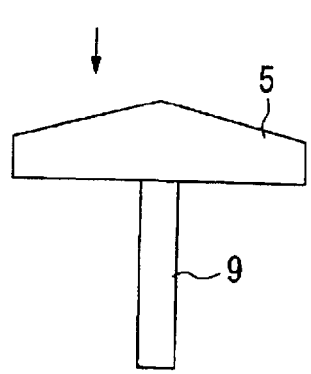

Preferably, the rotary body assumes the form of a body of revolution about the axis of rotation R, and the body of revolution partially has a protrusion, a groove portion, a hole portion, or the like. For example, as shown in FIG. 2(a), the rotary body may assume the form of a disk; as shown in FIG. 2(b), the rotary body may assume a funnel-like form having the depressed center; or as shown in FIG. 2(c), the rotary body may assume a cone-like form having the projected center. These rotary bodies may have a protrusion portion or a groove portion formed thereon. As shown in FIG. 1, the rotary body may assume a container-like form having a bottom portion and a sidewall, which has a plurality of hole portions 11 formed therein. This container-like rotary body is particularly preferred. In the case of the container-like rotary body, a molten material is supplied into the interior of the rotary body and is sprinkled through the holes formed in the sidewall by the effect of a centrifugal force of the rotating rotary body.

In FIGS. 2(a) to 2(c), a molten material is supplied from above, and the rotary-body drive mechanism 9 is connected to each of the rotary bodies from the side opposite the supply side of the molten material.

Since a molten material is sprinkled by means of the rotary body and the thermal capacity of the rotary plate is small, the molten material does not solidify on the rotary body, whereby the molten material can be deposited and to solidify on the inner wall of the cylindrical mold.

The rotary body 5 of the present invention permits a considerable reduction in volume as compared with a box-like tundish used in the conventional CC process, thereby reducing the thermal capacity. That is, even when the amount of supply of a molten material per unit time is small, heat radiation is of a small magnitude, thereby avoiding a drop in the temperature of the molten material during casting.

Average deposition rate of a molten material on the cylindrical mold is represented by V/S (unit: cm/sec), wherein V is the casting amount (volume) of the molten material per unit time, and S is the casting area of the molten material. The centrifugal casting method and the centrifugal casting apparatus of the present invention permit a decrease in V and an increase in S, thereby facilitating a decrease in V/S as compared with a conventional casting apparatus.

Preferably, the rotary body 5 of the present invention is manufactured from steel stock, stainless steel, a copper alloy, or the like in consideration of heat resistance, thermal conductivity, or the like. Preferably, a portion which comes in direct contact with a molten material is lined with a refractory of good heat insulating and retaining properties. Specific examples of such a refractory include alumina refractories, mullite refractories, zirconia refractories, calcia refractories, and magnesia refractories. Particularly, in casting an R-T-B-type rare-earth alloy or a hydrogen storage mischmetal-nickel alloy, an alumina refractory is preferred as the lining material. In casting a metal of high melting point, preferably, pure copper or a copper alloy, which exhibits good thermal conductivity, is selected, and water cooling is performed as needed.

Dimensions of the rotary body 5 of the present invention must be selected according to the amount of melt casting and the molten-material pouring rate. For example, at an amount of melt casting of 50 kg to 500 kg, an inside diameter is preferably selected from the range of from 200 mm to 400 mm in the case of a container-like rotary body having a top opening and a cylindrical sidewall. The length of the container-like rotary body is not particularly limited. Generally, a length slightly smaller than the inside diameter is preferred.

In the case of a container-like rotary body having a hole portion 11 for sprinkling a molten material therethrough, the hole portion 11 is formed in such a manner as to extend through the container-like rotary body from the inside of the container to the outside. Preferably, in order to uniformly sprinkle the molten material within a mold and to obtain an ingot of a homogeneous microstructure, a plurality of hole portions 11 are provided. In order to prevent blocking of a hole portion 11 which would otherwise tend to occur at the initial stage of casting due to, particularly, a drop in the temperature of the molten material, the diameter of each of the hole portions 11 is preferably not less than 1 mm, more preferably not less than 1.5 mm. In order to improve the homogeneity of an ingot, the hole portion diameter is preferably not greater than 5.0 mm, more preferably not greater than 3.0 mm. The hole portion diameter must be decreased when the number of hole portions provided on the container-like rotary body 5 is relatively large. By contrast, the hole portion diameter must be increased when the number of hole portions is relatively small. Preferably, as a guideline, the hole portion diameter and the number of hole portions are selected from various combinations thereof while the total area of openings of hole portions, $N \times \pi D^2/4$, is held constant, wherein D is the hole portion diameter, and N is the number of hole portions.

The rotational speed of the rotary body is determined in consideration of the following factors. A sufficient rotational speed is employed so that a molten-material flow discharged from the rotary body assumes such a discharge velocity that the molten material can reach the inner wall of a mold and can impinge on the inner wall while maintaining a sufficient velocity even when flying toward an upper portion of the mold. For example, in the case of a container-like rotary body, when the viscosity of the molten material is ignored, a discharge velocity Vr of the molten material in a radial direction of the container-like rotary body is expressed by $Vr=(2\alpha h)^{1/2}$, wherein h is the width of a cylindrical molten material pressed against the side wall of the container-like rotary body by the effect of centrifugal force, and $\alpha$ is a centrifugal force as measured on the inner wall of the container-like rotary body. $\alpha$ is expressed by $\alpha=2Di \times (\pi Rt)^2$, wherein Di is the diameter of the inner wall of the container-like rotary body, and Rt is the rotational speed (the number of revolutions per unit time) of the container-like rotary body. Thus, the discharge velocity Vr is expressed by $Vr=2\pi Rt(Dih)^{1/2}$. There must be selected such conditions under which the molten material impinges on the inner wall of the mold while the vectorial sum of the discharge velocity and a peripheral velocity Vs of the container-like rotary body maintains a sufficient magnitude of speed even when deceleration caused by influence of gravity is taken into consideration. Notably, the peripheral velocity Vs is represented by $Vs=\pi \times R_0 \times Rt$, wherein $R_0$ is the diameter of an outer wall portion of the container-like rotary body.

A molten material sprinkled by the effect of rotation of the rotary body 5 is deposited and solidifies on the inner surface of the cylindrical mold 4 rotating about the axis of rotation L.

In this case, the angle of inclination θ formed by the axis of rotation R of the rotary body and the axis of rotation L of the cylindrical mold is caused not to assume 0; i.e., the axis of rotation R and the axis of rotation L are caused not to run parallel to each other. The expression "caused to be deposited and to solidify" means that the molten material is caused to impinge on the mold wall or an ingot which has already being deposited and solidified, and then to solidify. Casting may be performed while a solidification layer which has already been deposited and solidified is being scraped off or while the molten material is being further deposited and solidified on an existing solidification layer. According to the present invention, the molten material is additionally deposited on an existing solidification layer to thereby promote epitaxial growth, whereby a large grain size can be realized.

A molten material to be deposited and to solidify in the present invention is pressed against the inner wall of the cylindrical mold by the effect of centrifugal force to thereby increase homogeneity thereof. Also, heat transfer to the cylindrical mold is accelerated, thereby increasing the cooling rate. In this case, the rotary body 5 and the cylindrical mold 4 are arranged such that the angle of inclination θ formed by the axis of rotation R of the rotary body 5 and the axis of rotation L of the cylindrical mold 4 does not assume 0, and the rotary body 5 and the cylindrical mold 4 are rotated, whereby the molten material can be caused to be deposited and to solidify over a broad range of the inner wall of the cylindrical mold 4. In this case, when the rotary body 5 and the cylindrical mold 4 rotate at the same speed (the number of revolutions per unit time; for example, rpm), the molten material is deposited at a limited place. As a result, a thick ingot is formed in a limited area inside the cylindrical mold 4. In this case, the deposition rate cannot be decreased as targeted in production of an ingot; thus, such casting conditions must be avoided. Also, when there is not much difference in rotational speed between the rotary body 5 and the cylindrical mold 4, the molten material tends to be deposited at a limited place; thus, a difficulty arises in obtaining an ingot of uniform microstructure. Also, when the rotary body 5 and the cylindrical mold 4 rotate at certain speeds, the molten material is selectively deposited at a certain portion of the inner surface of the cylindrical mold 4, resulting in impaired uniformity of deposit. Thus, such casting conditions must be avoided.

In order to avoid formation of nonuniform microstructure stemming from casting conditions, there is preferably a difference of not less than 10%, more preferably not less than 20%, in rotational speed between the rotary body 5 and the cylindrical mold 4.

In the present invention, the angle of inclination θ formed by the axis of rotation R of the rotary body 5 and the axis of rotation L of the cylindrical mold 4 generally fulfills the relationship 0°<θ<90°. There is also included a case where the axis of rotation R and the axis of rotation L are not on the same plane. In this case, one of the two axes of rotation is projected onto a plane which includes the other axis of rotation. An angle formed by the axis of rotation R and the axis of rotation L on the plane is used as the angle of inclination.

When the centrifugal casting apparatus of the present invention is disposed such that the axis of rotation L of the cylindrical mold becomes horizontal with respect to the ground, the rotational speed of the cylindrical mold is preferably determined at least such that a centrifugal force imposed on the molten material is not less than 1 G, so that, when the molten material reaches an upper portion of the mold, the molten material does not fall gravitationally. As the centrifugal force is increased, the cast molten material becomes more likely to spread on the inner wall of the mold by the effect of the centrifugal force. Thus, the cooling effect is enhanced, thereby improving homogeneity. For this reason, according to the centrifugal casting method of the present invention, the rotational speed of the cylindrical mold is determined such that the centrifugal force becomes preferably not less than 3 G, more preferably not less than 5 G. When the axis of rotation L of the mold is arranged perpendicularly to the ground, a basis for determination of the rotational speed does not much differ from that in the case where the axis of rotation L is arranged horizontally.

According to the conventional CC process, a molten material is supplied onto a mold surface which moves while rotating, through a nozzle of a box-like tundish in gravity-falling. In the conventional CC process, the molten material is apt to impinge on projected portions of an ingot which has already been deposited and solidified. Thus, surface roughness of the ingot tends to grow further. Particularly, when the deposition rate is decreased in order to increase the solidification-cooling rate, the molten metal solidifies before a centrifugal force causes the molten material to spread uniformly. As a result, surface roughness tends to exhibit a marked growth. Thus, when the conventional CC process employs a low deposition rate, these phenomena cause a significant impairment in the commercial value of an obtained ingot.

By contrast, according to the present invention, the rotary body or the container-like rotary body is used for sprinkling a molten material, thereby applying a centrifugal force to the molten material. Since the molten material is supplied onto the inner wall of the mold at higher speed, even when pits and projections are formed on an ingot which has already been deposited and solidified, the molten material tends to be uniformly supplied even to pit portions. Also, a centrifugal force generated by the cylindrical mold is additionally applied to the molten material, causing the molten material to spread uniformly in a more favorable manner and then solidify. Therefore, an ingot having a smooth surface of few pits and projections can be produced.

The form of the cylindrical mold in the present invention may be determined so as to facilitate work; specifically, so as to facilitate manufacture of the apparatus, casting, maintenance and setup of the mold, collection of a cast ingot, etc. Particularly, in the present invention, the rotary body is set substantially at a central portion of the cylindrical mold such that the axis of rotation R of the rotary body and the axis of rotation L of the cylindrical mold form a certain angle of inclination θ, which may be variable in a certain case. Thus, it is appropriate that the inside diameter of the cylindrical mold be at least not less than 500 mm and that the width of the cylindrical mold is not greater than two times the inside diameter of the cylindrical mold.

In the present invention, the orientation of the cylindrical mold is not particularly limited. For example, the axis of rotation L of the cylindrical mold may be arranged in the vertical direction or in the horizontal direction.

Preferably, the cylindrical mold of the present invention is generally manufactured from cast iron because of easy procurement and good machinability or is manufactured from steel stock; for example, a hot rolled steel plate specified by JIS G 3193 or a rolled steel for welded structure specified by JIS G 3106. Alternatively, copper or a copper alloy, which exhibits better heat conductivity than does steel stock, may be employed.

The mold thickness must be selected carefully, since the thickness influences the capability of the mold for cooling an ingot. According to the present invention, the mold thickness is preferably not less than three times the thickness of an ingot to be cast, more preferably not less than five times the thickness of an ingot to be cast, so as to enhance the cooling capability. Through employment of such a mold thickness, the rate of cooling a cast ingot can be increased; oxidation of a cast ingot can be suppressed during collection of the ingot; and a thermal load imposed on a worker can be reduced.

According to the above-described example, a molten material is supplied from the crucible to the rotary body. Rotation of the rotary body causes the molten material to be sprinkled for deposition and solidification on the inner wall of the cylindrical mold. However, the present invention is not limited thereto.

Figure 3:
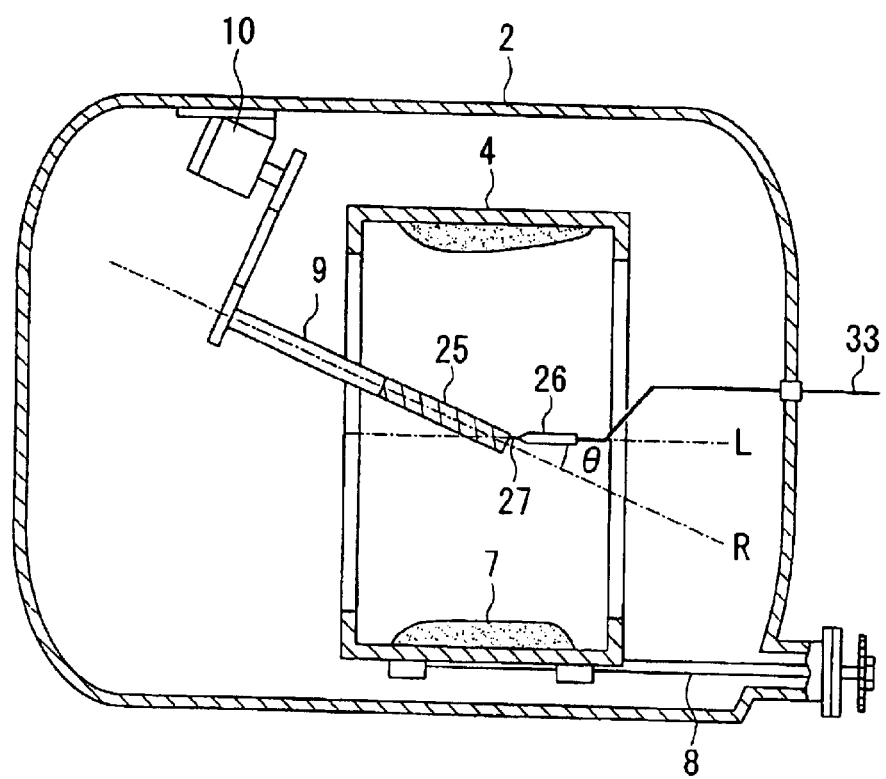
FIG. 3 is a longitudinal sectional view showing another example of a casting apparatus of the present invention.

For example, an alternative apparatus as shown in FIG. 3 may be employed. Specifically, a rodlike metal-containing material body 25 is attached to a rotation drive mechanism 9. The metal-containing material body 25 is melted while being rotated, by use of an arc or plasma arc 27 generated by melting means. Specifically, the metal-containing material body 25 is melted by use of a plasma arc 27 generated by a plasma torch 26 serving as the melting means. Current is supplied to the plasma torch 26 by means of an arc current lead wire 33.

Figure 4:
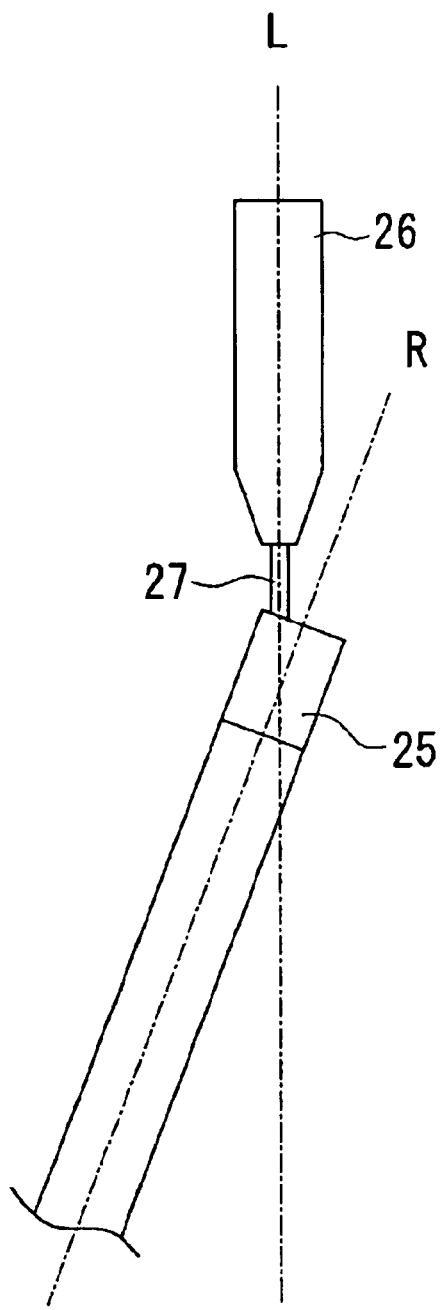
FIG. 4 is a side view showing an example method for melting a metal-containing material body by means of a plasma arc.

In this case, as shown in FIG. 4, a melting position on an end of the metal-containing material body 25 is slightly biased from the axis of rotation R; as a result, a molten material can be sprinkled in directions substantially perpendicular to the axis of rotation R by the effect of centrifugal force associated with rotation of the metal-containing material body 25. The sprinkled molten material is caused to be deposited and to solidify on the inner surface of the cylindrical mold 4 rotating about the axis of rotation L.

No particular limitations are imposed on means for attaching the metal-containing material body 25 to the rotation drive mechanism 9. For example, various means, such as screwing, clamping, and welding, can be employed.

This method requires melting means but allows omission of a crucible, a trough, and a rotary body.

Preferably, in the centrifugal casting method of the present invention, the rotary body or the metal-containing material body and the cylindrical mold rotate in the same direction. Employing different rotational directions increases the relative speed between the rotary body or the container-like rotary body and the cylindrical mold. However, in this case, the incident angle of the molten material upon impingement on the cylindrical mold becomes too small for the molten material to spread on the cylindrical mold. As a result, the impinging molten material tends to splash, resulting in impaired yield.

According to the present invention, in order to enhance a decrease in average deposition rate of the molten material, the angle of inclination θ formed by the axis of rotation R and the axis of rotation L of the cylindrical mold preferably assumes not less than 5 degrees, more preferably not less than 10 degrees, most preferably not less than 15 degrees. However, when the angle of inclination θ is in excess of 40 degrees, a structural difficulty arises in arranging the cylindrical mold and the container-like rotary body or the like. Also, the molten material sprinkling from the rotary body or the like is apt to splash upon impingement on the mold, and the percentage of the molten material splashing out of the mold increases, resulting in decreased yield. Thus, the casting method of the present invention preferably employs an angle of inclination θ of not greater than 35 degrees, more preferably not greater than 30 degrees.

Preferably, the angle of inclination θ formed by the axis of rotation L of the cylindrical mold and the axis of rotation R of the rotary body or the metal-containing material body is varied within the above-mentioned range during casting. This is because, if the angle of inclination θ is fixed, an ingot tends to become thick in the vicinity of opposite ends of the inner wall of the cylindrical mold and to become thin in the vicinity of the center of the inner wall. Casting while the angle of inclination θ is varied renders the thickness distribution of an obtained ingot uniform in a more favorable manner. In this case, the angle of inclination θ may assume 0. For example, the angle of inclination θ may be continuously or discontinuously varied in the range of from −20 degrees to 20 degrees. In this case, the angle of inclination θ preferably includes an angle of 5 degrees to 40 degrees.

In the present invention, the cylindrical mold 4 or the rotary body 5 may be reciprocated along the axis of rotation L during casting, thereby causing a molten material to be deposited and to solidify at uniform thickness throughout the inner surface of the cylindrical mold. The cylindrical mold 4 and the rotary body 5 may be relatively moved; i.e., in place of the cylindrical mold 4 being reciprocated, only the rotary body 5 may be reciprocated along the axis of rotation L. In this case, a mechanism for varying the angle of inclination θ and a mechanism for reciprocating the cylindrical mold or the like along the axis of rotation L may be operated independently of each other, but are preferably operated in a concurrent manner.

In the present invention, in order to increase the solidification-cooling rate, average deposition rate during deposition of the molten material on the inner wall of the cylindrical mold is preferably set to a low level. Specifically, average deposition rate is preferably in the range of 0.015 cm/sec to 0.001 cm/sec, more preferably in the range of 0.010 cm/sec to 0.001 cm/sec. In the case of casting an alloy containing a rare-earth element(s) in an amount of not greater than about 12.5 at. %, average deposition rate is particularly preferably in the range of 0.005 cm/sec to 0.001 cm/sec, since formation of the dendritic αFe phase is reduced. Through employment of such a range of the deposition-solidification rate, heat input to an ingot per unit time and unit area decreases. As a result, the surface temperature of the ingot during casting drops, thereby increasing the solidification-cooling rate of a deposit layer of additionally supplied molten material.

According to the present invention, a deposit layer of additionally supplied molten material and the surface layer of an existing solidified ingot fuse together, whereby crystals can grow in an epitaxial manner. Thus, crystals grow also in a direction perpendicular to the thickness direction. Therefore, as compared with the SC process, the present invention provides an alloy of sufficiently large crystals.

However, when the deposition rate is set too low, the surface temperature of an ingot during casting becomes too low, causing insufficient fusion. As a result, crystals become unlikely to grow in an epitaxial manner. Also, when fusion is insufficient, a gap may be formed at the lamination interface. Since such a gap hinders transfer of heat, a sufficient cooling effect cannot be obtained.

The present inventors studied alloys of various compositions in an attempt to avoid such phenomena and found that such phenomena can be avoided at an average surface temperature of an ingot of 0.4T to 0.8T, preferably 0.5T to 0.8T, as measured during casting, wherein T (K) is the solidification starting point of an alloy to be cast. The surface temperature of an ingot during casting can be measured through a measurement window formed in the casting chamber by use of a radiation pyrometer or the like. In order to improve accuracy of a measured temperature, a calibration curve must be prepared in advance in the following manner. A metallic piece which allows temperature measurement by use of a thermocouple is actually heated and measured for temperature through the same measurement window by use of an optical pyrometer. The results of measurement are collated with the results of measurement by use of the thermocouple, thereby forming the calibration curve.

In addition to production of an ingot through repeated deposition and solidification of the molten material on the inner wall of the cylindrical mold, the centrifugal casting method of the present invention can also produce a thin ingot or a ribbon deposited, solidified product without involvement of deposition of the molten material on an existing deposited ingot. In this case, as the peripheral velocity of the cylindrical mold increases, an obtained ribbon becomes thinner, thereby increasing the rate of solidification. In order to continuously mass-produce a thin ingot or a ribbon-like deposited, solidified product, a solidified product which is deposited on the cylindrical mold must be collected continuously. Specific methods are as follows: a deposited, solidified product is continuously scraped off from a mold by means of an air knife, a mechanical scraper, or the like; a cylindrical mold is formed in such a manner as to be open downward, thereby causing a deposited, solidified product to fall; and a mold is instantaneously split apart to thereby strip an ingot off.

The casting method of the present invention is suited for casting a rare-earth magnet alloy, a rare-earth hydrogen storage alloy, and an alloy containing a high-melting-point element, in contrast to a conventional casting method which encounters difficulty in casting such alloys.

The rare-earth magnet alloy which the casting method of the present invention is suited for casting is an alloy containing as rare-earth elements one or more elements selected from among Nd, Pr, and Dy, particularly an R-T-B-type rare-earth magnet alloy.

The rare-earth hydrogen storage alloy which the casting method of the present invention is suited for casting is a mischmetal-nickel alloy which contains an intermetallic compound serving as an important component thereof, the intermetallic compound assuming an $M_1T_5$ phase, which contains a mischmetal M, which is a mixture of rare-earth elements, such as Ce, La, Nd, and Pr; and a transition metal T, which includes Ni as a fundamental element, at the ratio 1:5.

The alloy containing a high-melting-point element which the casting method of the present invention is suited for casting is a metal, an alloy, or an intermetallic compound having a melting point or a solidification starting temperature of 1400° C. or higher, particularly an alloy or an intermetallic compound containing Ti.

The casting method of the present invention can produce an alloy whose microstructure cannot be attained by a conventional casting method, and a highly homogeneous alloy. Furthermore, through subjection of a cast ingot to heat treatment, the microstructure of the ingot can be modified, or the homogeneity of microstructure of the ingot can be enhanced. The heat treatment temperature for an R-T-B-type rare-earth magnet alloy preferably falls within the range of from 900° C. to 1,150° C. When the heat treatment temperature is lower than 900° C., diffusion of atoms becomes insufficient. By contrast, when the heat treatment temperature is in excess of 1,150° C., a temperature region where $\gamma$Fe is generated is reached. As a result, after cooling, an $\alpha$Fe phase is generated through transformation of $\gamma$Fe. Also, marked coarsening of microstructure will result.

An R-T-B-type rare-earth magnet alloy cast by an ordinary casting method (so-called book mold process) may be heat-treated at a temperature of 1,000° C. to 1,150° C. for a long period of time in order to eliminate the dendritic $\alpha$Fe phase. By contrast, a cast alloy (ingot) of the present invention can be used as a magnet alloy powder merely through pulverization without need of heat treatment. A pulverization process is not particularly limited. Hydrogen decrepitation, mechanical pulverization, a combined process of hydrogen decrepitation and mechanical pulverization, or the like is applicable. Particularly, an R-T-B-type rare-earth magnet alloy produced by the casting method of the present invention can be such that, even in an as-cast state of the alloy (a state in which heat treatment or the like is not performed after casting, for elimination of the dendritic $\alpha$Fe phase, modification of crystalline microstructure, or the like), there can be reduced a percentage occupied by a microstructure containing the dendritic $\alpha$Fe phase deposited in a dotting condition on a cross section of a cast product taken along a thickness direction. The microstructure containing the dendritic $\alpha$Fe phase means a microstructure containing the dendritic $\alpha$Fe phase, the T1 phase, the R-rich phase, or the like in a co-existence condition as observed on a back scatterd electron micrograph of an ingot cross section. A region occupied by this microstructure can be discriminated from a microstructure comprising predominantly the T1 phase and the R-rich phase. As will be described later, even in the case of a TRE content of less than 11.8 at. %, this microstructure can be discriminated from a microstructure comprising predominantly, without formation of the dendritic $\alpha$Fe phase, the T1 phase and lamellar Fe. An area percentage occupied by a microstructure containing the dendritic $\alpha$Fe phase is obtained in the following manner. A back scatterd electron micrograph of a cross section of an ingot is taken at each of 10 positions located on the cross section in an equally spaced condition along a thickness direction. These micrographs are analyzed by means of an image processor, thereby obtaining the area of the above-mentioned region containing the dendritic $\alpha$Fe phase. The thus-obtained area is divided by the total area of the micrographs. The thus-obtained value is expressed in percent, thereby obtaining the above-mentioned area percentage.

The casting method of the present invention can provide a rare-earth magnet alloy which is obtained through casting, characterized by containing one or more elements selected from among Nd, Pr, and Dy in a total amount of 11.0 at. % to 15.2 at. % (25.0% by mass to 33.0% by mass), more preferably 11.8 at. % to 14.4 at. % (26.5% by mass to 31.5% by mass), most preferably 11.8 at. % to 13.5 at. % (26.5% by mass to 30.0% by mass), and characterized in that, when determined in an as-cast state of the alloy, a microstructure containing the dendritic $\alpha$Fe phase occupies an area percentage of not greater than 10% as measured on a cross section of a cast product taken along a thickness direction and that the cast product assumes a thickness of 3 mm to 30 mm, more preferably 5 mm to 20 mm. Such a rare-earth magnet alloy cannot be obtained by a conventional casting method.

The casting method of the present invention can provide a rare-earth magnet alloy which is obtained through casting, characterized by containing one or more elements selected from among Nd, Pr, and Dy in a total amount of 11.0 at. % to 15.2 at. % (25.0% by mass to 33.0% by mass), more preferably 11.8 at. % to 14.4 at. % (26.5% by mass to 31.5% by mass), most preferably 11.8 at. % to 13.5 at. % (26.5% by mass to 30.0% by mass), and characterized in that, when determined in an as-cast state of the alloy, a microstructure containing dendritic $\alpha$Fe occupies an area percentage of not greater than 10% as measured on a cross section of a cast product taken along a thickness direction and that crystal grains having a diameter of not less than 1,000 $\mu$m as measured along a long axis occupy an area percentage of 10% to 98% as measured on the cross section.

An area percentage occupied by crystal grains having a diameter of not less than 1,000 $\mu$m as measured along a long axis is obtained in the following manner. Sequence photographs of a cross section of an ingot extending from the surface having been in contact with a mold (mold contact surface) to the opposite surface (free surface) are taken through a polarization microscope. The photographs are analyzed by means of an image processor, thereby identifying crystal grains having a diameter of not less than 1,000 $\mu$m as measured along a long axis and obtaining the total area of the crystal grains. The thus-obtained total area is divided by the total area of the photographs. The thus-obtained value is expressed in percent, thereby obtaining the above-mentioned area percentage.

The present invention can provide an R-T-B-type rare-earth magnet alloy which is obtained through casting, characterized in that, when determined in an as-cast state of the alloy, a microstructure containing the dendritic $\alpha$Fe phase occupies an area percentage of not greater than 10% as measured on a cross section of a cast product taken along a thickness direction and that the cast product assumes a thickness of 3 mm to 30 mm, more preferably 5 mm to 20 mm.

The present invention can provide an R-T-B-type rare-earth magnet alloy which is obtained through casting, characterized in that, when determined in an as-cast state of the alloy, a microstructure containing dendritic $\alpha$Fe occupies an area percentage of not greater than 10% as measured on a cross section of a cast product taken along a thickness direction and that crystal grains having a diameter of not less than 1,000 $\mu$m as measured along a long axis occupy an area percentage of 10% to 98% as measured on the cross section.

The present invention can provide a rare-earth magnet alloy which is obtained through casting, characterized by containing one or more elements selected from among Nd, Pr, and Dy in a total amount of 11.0 at. % to 15.2 at. % (25.0% by mass to 33.0% by mass), more preferably 11.8 at. % to 14.4 at. % (26.5% by mass to 31.5% by mass), most preferably 11.8 at. % to 13.5 at. % (26.5% by mass to 30.0% by mass), and characterized in that, when determined in an as-cast state of the alloy, the dendritic αFe phase is substantially absent as observed on a cross section of a cast product taken along a thickness direction and that the cast product assumes a thickness of 3 mm to 30 mm, more preferably 5 mm to 20 mm.

Notably, a rare-earth magnet alloy containing substantially no dendritic αFe phase is an alloy in which a microstructure containing the dendritic αFe phase deposited primarily in a dotting condition on a cross section of a cast product taken along a thickness direction occupies an area percentage of not greater than 5%, more preferably not greater than 3%.

The present invention can provide a rare-earth magnet alloy which is obtained through casting, characterized by containing one or more elements selected from among Nd, Pr, and Dy in a total amount of 11.0 at. % to 15.2 at. % (25.0% by mass to 33.0% by mass), more preferably 11.8 at. % to 14.4 at. % (26.5% by mass to 31.5% by mass), most preferably 11.8 at. % to 13.5 at. % (26.5% by mass to 30.0% by mass), and characterized in that, when determined in an as-cast state of the alloy, the dendritic αFe is substantially absent as observed on a cross section of a cast product taken along a thickness direction; crystal grains having a diameter of not less than 1,000 μm as measured along a long axis occupy an area percentage of 50% to 98%, more preferably 80% to 98%, as measured on the cross section; and the cast product assumes a thickness of 3 mm to 30 mm, more preferably 5 mm to 20 mm.

The present invention can provide a rare-earth magnet alloy which is obtained through casting, characterized by containing one or more elements selected from among Nd, Pr, and Dy in a total amount of 11.0 at. % to 15.2 at. % (25.0% by mass to 33.0% by mass), more preferably 11.8 at. % to 14.4 at. % (26.5% by mass to 31.5% by mass), most preferably 11.8 at. % to 13.5 at. % (26.5% by mass to 30.0% by mass), and characterized in that, when determined in an as-cast state of the alloy, the dendritic αFe is substantially absent as observed on a cross section of a cast product taken along a thickness direction; as measured on the cross section, crystal grains having a diameter of not less than 1,000 μm as measured along a long axis occupy an area percentage of 50% to 98%, more preferably 80% to 98%, and crystal grains assume an average diameter of not less than 60 μm as measured along a short axis; and the cast product assumes a thickness of 3 mm to 30 mm, more preferably 5 mm to 20 mm.

Figure 8:
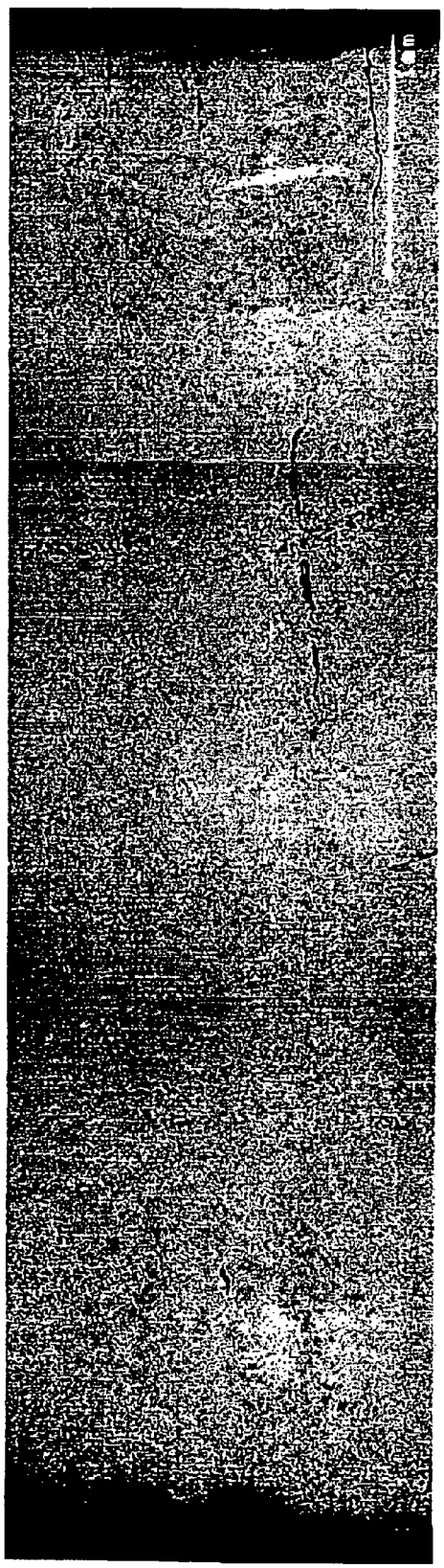
FIG. 8 is a back scatterd electron micrograph of a cross section of an alloy comprising 11.6 at. % Nd, 5.9 at. % B, and a balance of Fe and produced by a casting apparatus of the present invention.
Figure 9:
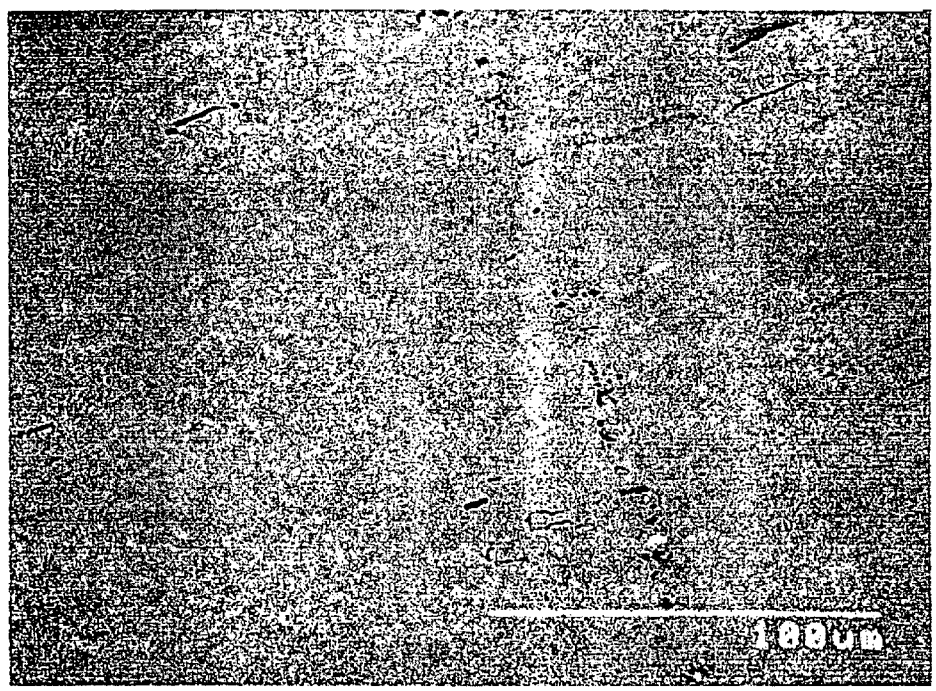
FIG. 9 is a back scatterd electron micrograph of higher magnification of the cross section of the alloy of FIG. 8.

FIGS. 8 and 9 show back scatterd electron micrographs of a cross section of a rare-earth magnet alloy of the present invention comprising 11.6 at. % Nd, 5.9 at. % B, and a balance of Fe. FIG. 9 is a partially enlarged view of FIG. 8. In FIG. 8, the upper side corresponds to the free surface, and the lower side corresponds to the mold contact surface. In FIG. 9, the right-hand side corresponds to the free surface, and the left-hand side corresponds to the mold contact surface.

In FIG. 8, the matrix phase is the T1 phase, and a deep black, dotty phase which is in a very small amount and appears partially on the cross section is the dendritic αFe phase. A phase appearing in a number of white dotty patterns and located in the vicinity of the dendritic αFe phase is the R-rich phase generated through deterioration of composition balance. In FIG. 9, a black, very thin, streak-like phase appearing in the T1 phase is the lamellar αFe phase. A white dotty R-rich phase, which is generated in the vicinity of the dendritic αFe phase, is not generated in the vicinity of the lamellar αFe phase. As seen in FIGS. 8 and 9, the dendritic αFe phase and the lamellar αFe phase can be easily discriminated from each other.

Figure 10:
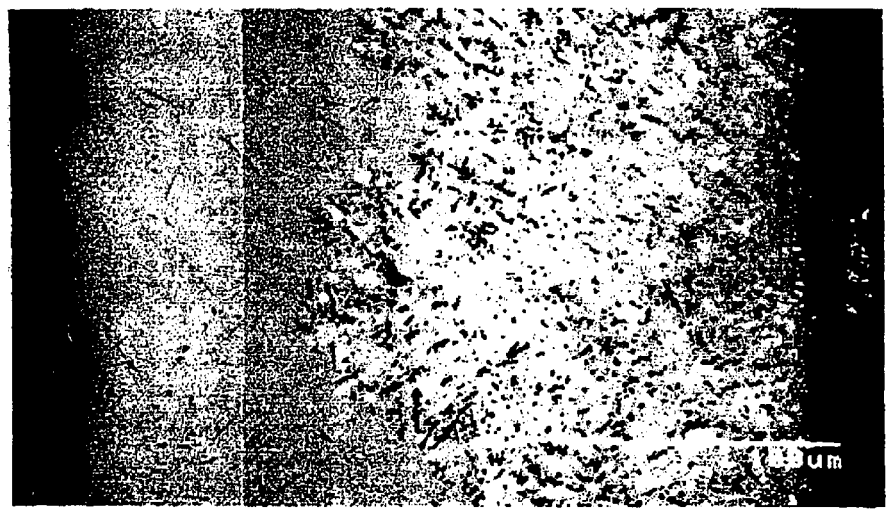
FIG. 10 is a back scatterd electron micrograph of a cross section of an alloy comprising 11.6 at. % Nd, 5.9 at. % B, and a balance of Fe and produced by the SC process.

FIG. 10 shows a back scatterd electron micrograph of a cross section of an alloy of the same composition cast by an SC process. FIG. 10 shows the gray T1 phase serving as the matrix phase and the dendritic αFe phase appearing in a number of deep black, dotty patterns and extending from a central portion of the cross section toward the free surface side (right-hand side in the drawing). The R-rich phase appearing in a number of white dotty patterns and generated because of deterioration of composition balance is observed in the vicinity of the dendritic αFe phase. Also, the thin, black, streak-like lamellar αFe phase extends from the roll surface side (left-hand side in the drawing) to a central portion of the cross section.

Generally, an Nd—Fe—B-type rare-earth magnet alloy exhibits the tendency that the lower the Nd content, the more dendritic αFe becomes likely to be generated. In order to prevent such generation of dendritic αFe, for example, Dy must be substituted for some portion of Nd, or the B content must be increased. In actuality, in a ternary rare-earth magnet alloy of Nd—Fe—B cast by the above-mentioned SC process, a large amount of dendritic αFe is generated. By contrast, the rare-earth magnet alloy of the present invention features suppression of generation of dendritic αFe without substitution of Dy for some portion of Nd or increase of B content.

As mentioned above, in the case of the rare-earth magnet alloy of the present invention, even when the TRE content (the total R content) is less than 11.8 at. %, which is not greater than the R content of an $R_2T_{14}B$ phase, generation of dendritic αFe, which is observed in a known microstructure, can be suppressed and excess Fe component can be formed into a lamellar form. Since the thickness of the lamellar αFe phase is very small, the lamellar αFe phase does not have any adverse effect on pulverization in a magnet production process.

An average diameter of crystal grains as measured along a short axis is obtained in the following manner. A photograph of a cross section of an ingot extending from the mold contact surface to the free surface is taken through a polarization microscope at each of 10 positions located on the cross section in an equally spaced condition along a thickness direction. On each of the photographs, 5 straight lines are drawn perpendicularly to the growth direction of column crystals. When letter N represents the number of intersections of a single straight line and grain boundaries, and letter L represents the length of the straight line, an average diameter of crystal grains associated with the straight line is expressed by the following expression.

(Average diameter of crystal grains as measured along a short axis)=$L/(N+1)$ 50 average diameter values associated with the 50 straight lines are averaged to thereby obtain an average diameter of crystal grains of the ingot as measured along a short axis.

By use of the centrifugal casting method of the present invention, a rare-earth magnet alloy of excellent magnetic properties can be produced. Particularly, the method of the invention can cast an ingot having a thickness of 3 mm to 30 mm, which is thicker than an ingot cast by the conventional SC process or CC process. Also, the method of the invention can provide an ingot of large crystal grains in which grains having a long axis of not less than 1,000 μm occupy 10% to 98%. Such large grains have been obtained only by means of a book mold process. The method of the invention can provide a cast product in which the area percentage of a microstructure containing the dendritic αFe phase is not greater than 10% when determined in an as-cast state of the alloy. Such a cast product cannot be obtained by means of a book mold process.

When this cast alloy is crushed, pulverized and then used in production of a sintered magnet, the degree of alignment does not drop during compaction in a magnetic field. Thus, the cast alloy is advantageously used in production of a sintered magnet. Also, this cast alloy is crushed and then subjected to the so-called HDDR (Hydrogenation-Disproportionation-Desorption-Recombination) treatment, in which crushed ingots are treated at high temperature in a hydrogen atmosphere through application of heat, and then evacuation is performed to thereby obtain crystal grains of preferred orientation. The thus-obtained powder is suited for use in production of an anisotropic bonded magnet. An anisotropic bonded magnet produced from the powder exhibits excellent magnetic properties.

A cast ingot which has or has not undergone heat treatment can be pulverized by use of a pulverizer, such as a jet mill, a ball mill, or a vibration mill. The particle size preferably falls within the range of 2 μm to 5 μm, more preferably within the range of 3 μm to 4 μm. The size of pulverized particles may be measured by use of, for example, FSSS (Fisher Sub-Sieve Sizer).

A sintered rare-earth magnet is produced by a single-alloy method or a two-alloy blending method. In the single-alloy process, a single kind of rare-earth magnet alloy powder is compacted in a magnetic field, followed by sintering. In the two-alloy blending method, a powder of an R-component poor R-T-B-type rare-earth alloy called a main-phase alloy and a powder of an R-component rich R-T-B-type rare-earth alloy or R-T-type rare-earth alloy called a boundary-phase alloy are blended.

A main-phase alloy of lower R-component content used in the two-alloy blending method becomes more suitable for production of a high-performance magnet. However, as mentioned previously, in the case of a CC process, an R-component content of 14.4 at. % (31.5 wt. %) or lower causes generation of a harmful dendritic αFe phase. Also, in the case of an SC process, an R-component content of 12.7 at. % (28.5 wt. %) or lower causes generation of a harmful dendritic αFe phase. Thus, these processes have encountered difficulty in producing a main-phase alloy of low R-component content without involvement of expensive solution heat treatment for elimination of the dendritic αFe phase.

However, an alloy produced by the centrifugal casting method of the present invention is characterized by containing one or more elements selected from among Nd, Pr, and Dy in a total amount of up to 11.0 at. % and characterized in that a microstructure containing the dendritic αFe phase occupies an area percentage of not greater than 10% as measured on a cross section of a cast product taken along a thickness direction. Thus, the alloy is favorably used as a main-phase alloy in a two-alloy blending method. Furthermore, crystal grains of the alloy are large such that crystal grains having a diameter of not less than 1,000 μm as measured along a long axis occupy an area percentage of 50% to 98%, thereby enhancing the degree of alignment of a magnet and thus enhancing remanence Br and maximum magnetic energy product (BH)max.

Accordingly, an alloy produced by the centrifugal casting method of the present invention favorably serves not only as a rare-earth magnet alloy for use in a single-alloy method but also as a main-phase alloy for use in a two-alloy blending method. That is, an excellent magnet can be obtained by a two-alloy blending method in which a powder of an alloy produced by the centrifugal casting method of the present invention and serving as a main-phase alloy is blended with a powder of an R-component rich alloy produced by an ordinary method and serving as a boundary-phase alloy.

Next will be described a method for producing a sintered magnet from a rare-earth magnet alloy produced by the centrifugal casting method of the present invention. However, the present invention is not limited to the method described below.

First, a rare-earth magnet alloy is pulverized to a particle size of preferably 2 μm to 5 μm, more preferably 3 μm to 4 μm, through sequential subjection to hydrogen decrepitation, coarse crushing, and fine pulverization. The size of particles obtained through pulverization can be measured by use of, for example, FSSS (Fisher Sub-Sieve Sizer). According to hydrogen decrepitation, mainly the R-rich phase of an ingot is caused to absorb hydrogen in a hydrogen gas atmosphere having a pressure of 200 Torr to 50 kg/cm², thereby generating an R-hydrogen compound. The generation of an R-hydrogen compound is accompanied by an increase in volume of the R-rich phase, which causes the ingot to break finely or a number of fine cracks to be generated within the ingot. Since, in the case of an alloy containing an R-component in an amount of 11.8 at. % or higher, the R-rich phase is present substantially without fail at grain boundaries of $R_2T_{14}B$ phase grains, hydrogen decrepitation causes generation of cracks at $R_2T_{14}B$ phase grains substantially without fail. Examples of a crusher used for coarse crushing include a Brown mill and a disk mill. By use of such a mill, crushing to a particle size of not greater than 500 μm is performed in an inert atmosphere, such as argon gas or nitrogen gas. Examples of a pulverizer for fine pulverization include a jet mill. By use of such a mill, pulverization to a particle size of 2 μm to 5 μm is performed in an inert atmosphere, such as argon gas or nitrogen gas. Because of large crystal grains, a rare-earth magnet alloy produced by the centrifugal casting method of the present invention can be formed into a powder substantially consisting of single crystals merely through mechanical pulverization by use of a Brown mill and a jet mill while a hydrogen decrepitation step is omitted. When hydrogen decrepitation is employed, a coarse crushing step can be omitted.

When the TRE content of a rare-earth magnet alloy produced by the centrifugal casting method of the present invention becomes 11.8 at. % or lower, the lamellar R-rich phase is substantially absent. As a result, hydrogen decrepitation utilizing the above-mentioned mechanism is disabled. However, since an $R_2T_{14}B$ phase expands through absorption of a small amount of hydrogen, an ingot can undergo expansion and decrepitation propagating from its surface toward the interior in a hydrogen atmosphere. Even at a TRE content of not greater than 11.8 at. %, a coupling force among atoms at $R_2T_{14}B$ phase grain boundaries is weaker than that in $R_2T_{14}B$ phase crystals. Thus, cracking can be generated at grain boundaries substantially without fail.

The thus-obtained powder is compacted by use of an apparatus for compaction in a magnetic field. In view of a magnetic field direction within a cavity, a die is manufactured through combination of a magnetic material and a nonmagnetic material. The compaction pressure is preferably 0.5 t/cm² to 2 t/cm². During compaction, the condition of a magnetic field within the cavity is preferably 0.5T to 2T. In order to reduce friction between the powder and the inner wall of the die and friction between powder particles for improvement of the degree of preferred orientation during compaction in a magnetic field, lubricant, such as zinc stearate, is preferably added to the powder. A preferred amount of lubricant to be added is 0.01 wt. % to 1 wt. %. Lubricant may be added before or after fine pulverization. Preferably, before compaction in a magnetic field, the powder containing lubricant is sufficiently blended in an inert gas atmosphere, such as argon gas or nitrogen gas, by use of a V-type blender or the like.

When a two-alloy blending method is to be employed in production of a sintered magnet, before compaction by use of an apparatus for compaction in a magnetic field, a main-phase alloy and a boundary-phase alloy must be blended. Blending may be performed before hydrogen decrepitation, before coarse crushing, before fine pulverization, or after fine pulverization. Preferably, before compaction in a magnetic field, the powders are sufficiently blended in an inert gas atmosphere, such as argon gas or nitrogen gas, by use of a V-type blender or the like.

Particularly, in the case of a main-phase alloy of a TRE content of not greater than 11.8 at. % produced by the centrifugal casting method of the present invention, since the lamellar R-rich phase is substantially absent, the alloy exhibits enhanced oxidization resistance during pulverization and in the form of a powder.

Next, a compact obtained through compaction in a magnetic field is sintered at a temperature of 1,000° C. to 1,150° C. Preferably, sintering is performed in an argon gas atmosphere or in a vacuum of not greater than $10^{-2}$ Torr. Holding time is preferably 1 hour or longer. Notably, before the sintering temperature is reached, lubricant and hydrogen contained in the compact must be completely removed. Preferably, for removal of lubricant, the compact is held in a vacuum of $10^{-2}$ Torr or an Ar flow atmosphere under reduced pressure at a temperature of 300° C. to 500° C. for 30 minutes or longer. Preferably, for removal of hydrogen, the compact is held in a vacuum of not greater than $10^{-2}$ Torr at a temperature of 700° C. to 900° C. for 30 minutes or longer.

After sintering, in order to enhance an coercive force, a sintered body can be heat-treated at a temperature of 450° C. to 650° C. as needed. Preferably, the heat treatment is performed in an argon gas atmosphere or a vacuum atmosphere. Holding time is preferably 30 minutes or longer.

A rare-earth hydrogen storage alloy, particularly a mischmetal-nickel hydrogen storage alloy, cast by the centrifugal casting method of the present invention is free from segregation of Mn or the like and is thus favorably usable as material for a negative electrode of a nickel-hydrogen battery.

EXAMPLES

The present invention will next be described in detail by way of example, which should not be construed as limiting the invention.

Example 1

Elemental neodymium, elemental dysprosium, ferroboron, aluminum, and electrolytic iron were weighed and mixed so as to obtain the following composition: Nd: 12.6 at. % (28.0% by mass); Dy: 0.6 at. % (1.5% by mass); B: 6.0 at. % (1.0% by mass); Al: 0.7 at. % (0.30% by mass); and a balance of iron. The resulting mixture was melted in an alumina crucible in an argon gas atmosphere by use of a high-frequency induction melting furnace. The resulting molten mixture was subjected to casting by use of the centrifugal casting apparatus shown in FIG. 1.

The cylindrical mold 4 was of an inside diameter of 500 mm and a length of 500 mm. The container-like rotary body 5 was of an inside diameter of 250 mm, and eight hole portions 11 of a 2 mm diameter were formed in the sidewall thereof. The angle of inclination θ formed by the axis of rotation R of the container-like rotary body 5 and the axis of rotation L of the cylindrical mold was fixed to 25 degrees during casting.

The average molten-material deposition rate for deposition on the inner wall of the mold was 0.01 cm/sec. The rotational speed of the mold was set to 103 rpm so as to generate a centrifugal force of 3 G. The rotational speed of the container-like rotary body 5 was 378 rpm so as to impose a centrifugal force of about 20 G on a molten material.

An obtained alloy ingot has a thickness of 7 mm as measured at a central portion of the cylindrical mold 4 and a thickness of about 12 mm as measured at thickest portions located in the vicinity of opposite end portions. Almost the whole macrostructure of the cross section of the alloy ingot, excluding a mold surface portion, was composed of columnar crystals. Observation through a back scatterd electron microscope revealed that the microstructure of the cross section was in good condition; specifically, the dendritic αFe phase is completely absent, and the R-rich phase is finely dispersed. Measurement of the grain size by use of a polarization microscope revealed that a microstructure comprising grains having an average diameter of not less than 90 μm as measured along a short axis and a diameter of not less than 1,000 μm as measured along the long axis occupied an area percentage of 89%, indicating that crystal grains have a size suited for use as material for a magnet alloy.

Comparative Example 1

The same materials as those used in Example 1 were weighted, mixed and melted so as to obtain the same composition as that of Example 1. The molten material was subjected to centrifugal casting by the method shown in FIG. 5, which uses a reciprocating box-like tundish 13.

A crucible 15 and a cylindrical mold 12 are disposed within a chamber 17 assembled through coupling by means of a flange 19. A molten material 20 melted in the crucible 15 is led to the tundish 13 by means of a sprue runner 14. The molten material 20 in the tundish 13 is discharged through a number of hole portions 18 formed in the tundish 13 to thereby be deposited on the inner wall surface of the rotating cylindrical mold 12. In this case, a tundish reciprocation mechanism 16 causes the tundish 13 to repeat reciprocation.

The cylindrical mold 12 has an inside diameter of 500 mm and a length of 1,000 mm. As in the case of Example 1, the rotational speed of the cylindrical mold 12 was set to 103 rpm so as to generate a centrifugal force of 3 G. The average molten-material deposition rate for deposition on the inner wall of the cylindrical mold was 0.018 cm/sec. In this casting method, a deposition rate lower than the level causes difficulty in maintaining the temperature of the molten material, tends to cause a problem, such as blocking of nozzles 18, and worsens the rough state of the ingot surface with a resultant impairment in commercial value. Thus, lowering the deposition rate below the level was avoided.

The average thickness of an obtained ingot was 8 mm. Observation of the microstructure of the cross section of the ingot revealed that a large amount of dendritic αFe precipitated in a region substantially half the thickness from the free surface, and that the microstructure containing the dendritic αFe phase occupied an area percentage of 15%.

Comparative Example 2

Figure 6:
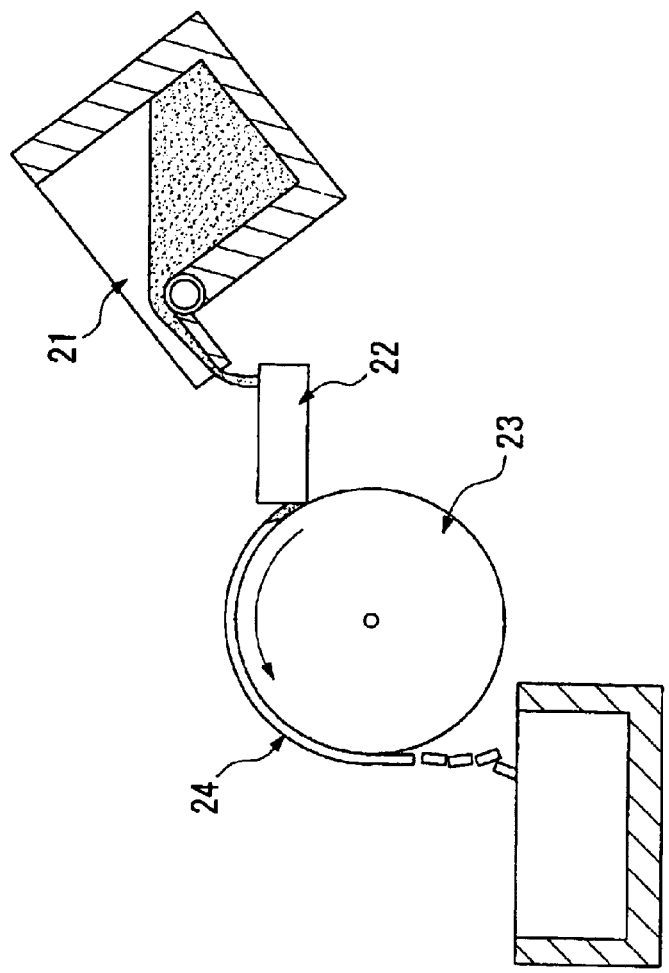
FIG. 6 is a sectional view showing a conventional producing apparatus which employs the SC process.
Figure 7:
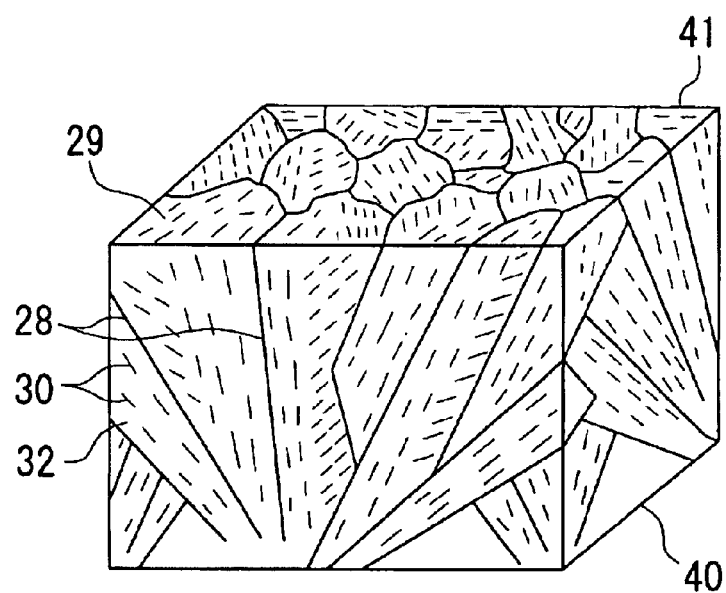
FIG. 7 is a schematic view showing an example of the microstructure of a cross section of an Nd—Fe—B-type ingot cast by the SC process.

The same raw materials as those used in Example 1 were weighed, mixed and melted so as to obtain the same composition as that of Example 1. Strip casting was performed by use of the casting apparatus shown in FIG. 6.

Specifically, a molten material melted in a crucible 21 is led, through a tundish 22, to a water-cooled rotary roll 23 of copper and solidifies upon contact with the rotary roll 23, whereby a strip-like ingot 24 is continuously produced, followed by coarse crushing.

The water-cooled rotary roll 23 of copper had an outer diameter of 400 mm and a peripheral velocity of 1 m/s.

Finally obtained ingots were flake-like and had an average thickness of 0.32 mm. Observation of the microstructure of the cross section of an obtained ingot revealed that the dendritic αFe phase was absent. However, measurement of the crystal grain size by use of a polarization microscope revealed that crystal grains had an average diameter of 26 μm as measured along a short axis and a maximum diameter of 283 μm as measured along a long axis. Also, a large amount of fine crystal grains were observed in a region on the cross section located in the vicinity of the roll surface.

Example 2

In order to obtain a composition in which TRE is further decreased, elemental neodymium, ferroboron, aluminum, and electrolytic iron were weighed, mixed so as to have the following composition: Nd: 12.4 at. % (28.0% by mass); B: 5.9 at. % (1.0% by mass); Al: 0.7 at. % (0.30% by mass); and a balance of iron. Casting was performed by use of an apparatus similar to that used in Example 1 under the same conditions as those of Example 1.

During casting, the container-like rotary body 5 was moved such that the angle of inclination θ formed by the axis of rotation R of the container-like rotary body 5 and the axis of rotation L of the cylindrical mold is varied continuously between 0 degree and 25 degrees. The average molten-material deposition rate was 0.004 cm/sec.

On the cross section of an ingot, the microstructure containing the dendritic αFe phase occupied an area percentage of 3%, and crystal grains having an average diameter of 75 μm as measured along a short axis and a diameter of not less than 1,000 μm as measured along a long axis occupied an area percentage of 90%. The thickness of an ingot was substantially uniform; specifically, an average of 10 mm.

Example 3

In order to obtain a composition in which TRE is further decreased, elemental neodymium, ferroboron, and electrolytic iron were weighed and mixed so as to have the following composition: Nd: 11.6 at. %; B: 5.9 at. %; and a balance of iron. Casting was performed by use of an apparatus similar to that used in Example 1 under the same conditions as those of Example 1 except that the angle of inclination θ formed by the axis of rotation R of the container-like rotary body 5 and the axis of rotation L of the cylindrical mold was varied continuously between 0 degree and 25 degrees and that the average molten-material deposition rate was 0.003 cm/sec.

The thickness of an ingot was substantially uniform; specifically, an average of 6 mm. FIGS. 8 and 9 show back scatterd electron micrographs of a cross section of an ingot. FIG. 9 is a partially enlarged view of FIG. 8. FIG. 8 shows the generation of the gray T1 phase serving as the matrix phase, a small amount of dendritic αFe phase, and the white dotty Nd-rich phase located in the vicinity of the dendritic αFe phase and generated because of deterioration of composition balance. FIG. 9 shows the generation of the black, very thin, streak-like lamellar αFe phase appearing in the T1 phase. As seen in FIGS. 8 and 9, the dendritic αFe phase and the lamellar αFe phase can be easily discriminated from each other. The microstructure containing the dendritic αFe phase occupied an area percentage of 8%. Crystal grains having an average diameter of 78 μm as measured along a short axis and a diameter of not less than 1,000 μm as measured along a long axis occupied an area percentage of 86%.

Comparative Example 3

The same raw materials as those used in Example 3 were weighed and mixed and melted so as to obtain the same composition as that of Example 3. Strip casting was performed by use of the casting apparatus used in Comparative Example 2. The peripheral velocity of the rotary roll was 1 m/s, and the amount of molten-material supply to the rotary roll per unit time was 80% that of Comparative Example 2. Flake-like ingots having an average thickness of 0.25 mm were obtained. FIG. 10 shows a back scatterd electron micrograph of a cross section of the obtained ingot. FIG. 10 shows the generation of the T1 phase serving as the matrix phase, the dendritic αFe phase, the white dotty Nd-rich phase generated because of deterioration of composition balance, and the black, very thin, streak-like lamellar αFe phase. As seen in the drawing, a large amount of the dendritic αFe phase and the white dotty Nd-rich phase generated because of deterioration of composition balance is generated on the cross section in a condition biased toward the free surface. Back scatterd electron micrographs as shown in FIG. 10 were taken for ten arbitrary flake-like ingots. Analysis of the micrographs by use of an image processor revealed that the microstructure containing the dendritic αFe phase occupied an area percentage of 35%. Measurement by use of a polarization microscope revealed that crystal grains had an average diameter of 25 μm as measured along a short axis and an average diameter of up to 228 μm as measured along a long axis.

Example 4

Elemental neodymium, ferroboron, and electrolytic iron were weighed and mixed so as to have the following composition: Nd: 11.4 at. %; B: 6.7 at. %; and a balance of iron. Casting was performed by use of an apparatus similar to that used in Example 1 under the same conditions as those of Example 3.

The thickness of an ingot was substantially uniform; specifically, an average of 6 mm. Observation of the microstructure of a cross section of an ingot by use of a back scatterd electron microscope revealed the generation of the T1 phase serving as the matrix phase, the very thin, streak-like lamellar αFe phase, a trace amount of dendritic αFe phase, and the dotty Nd-rich phase located around the dendritic αFe phase. The microstructure containing the dendritic αFe phase occupied an area percentage of 1%. Crystal grains having an average diameter of 79 μm as measured along a short axis and a diameter of not less than 1,000 μm as measured along a long axis occupied an area percentage of 87%.

In contrast to Example 3, in spite of reduction in TRE, the microstructure containing the dendritic αFe phase occupies a very low area percentage. The conceivable reason for this is that the B content is increased.

Comparative Example 4

The same raw materials as those used in Example 4 were weighed and mixed and melted so as to obtain the same composition as that of Example 4. Casting was performed by use of the casting apparatus used in Comparative Example 2 and under the same conditions as those of Comparative Example 3.

The average thickness of obtained flake-like ingots was 0.25 mm. The microstructure containing the dendritic αFe phase occupied an area percentage of 14% as obtained by a method similar to that of Comparative Example 3. Measurement by a method similar to that of Comparative Example 3 revealed that crystal grains had an average diameter of 24 μm as measured along a short axis and an average diameter of up to 225 μm as measured along a long axis.

Example 5

The ingot cast in Example 1 was coarsely crushed by use of a disk mill without involvement of hydrogen decrepitation. Subsequently, a powder having an average particle size of 3.3 μm was obtained by use of a jet mill. The obtained powder was compacted at a pressure of 1 t/cm$^2$ in a horizontal magnetic field of 1.5 T. The resulting compact was sintered at 1050° C. in a vacuum for 4 hours. The resulting sintered body was heat-treated at 600° C. for one hour. The heat-treated sintered body was machined to a sintered magnet assuming the form of a 20 mm cube. Before pulverization by use of the jet mill, a zinc stearate powder serving as lubricant was added in an amount of 0.07 wt. %. The major composition of the powder measured by use of a X-ray fluorescence analyzer and an ICP analyzer was as follows: Nd: 12.4 at. %; Dy: 0.6 at. %; B: 6.0 at. %; Al: 0.7 at. %; and Fe: balance. Evaluation of the sintered magnet by use of a BH curve tracer revealed that the sintered magnet had the following properties: Br: 1.41 T; iHc: 1114 kA/m; and (BH)max: 354 kJ/m$^3$. Thus, a magnet of excellent magnetic properties was obtained.

Comparative Example 5

As in the case of Example 5, the alloy ingot cast in Comparative Example 1 was coarsely crushed by use of a disk mill without involvement of hydrogen decrepitation. Subsequently, a powder having an average particle size of 3.4 μm was obtained by use of a jet mill. A sintered magnet was manufactured by a method similar to that of Example 5.

The major composition of the powder measured by use of a X-ray fluorescence analyzer and an ICP analyzer was as follows: Nd: 12.8 at. %; Dy: 0.6 at. %; B: 6.0 at. %; Al: 0.7 at. %; and Fe: balance.

The magnetic properties of the sintered magnet measured by use of a BH curve tracer were as follows: Br: 1.34 T; iHc: 915 kA/m; and (BH)max: 318 kJ/m$^3$. Thus, a magnet of poor magnetic properties was obtained.

The conceivable reasons for this include the following: since a large amount of dendritic αFe generated in the alloy ingot is unlikely to be pulverized, a certain amount of dendritic αFe remained within the pulverizer, with a resultant shift, toward the high-TRE side, of the composition of a mixed powder obtained through pulverization; a large amount of dendritic αFe is also contained in the powder, thereby causing a disturbance of magnetic-field distribution within a die cavity during compaction in a magnetic field, with a resultant impairment in the degree of preferred orientation; and αFe remaining in the sintered body caused impairment in squareness.

Comparative Example 6

As in the case of Example 5, the alloy ingot cast in Comparative Example 2 was coarsely crushed by use of a disk mill without involvement of hydrogen decrepitation. Subsequently, a powder having an average particle size of 3.3 μm was obtained by use of a jet mill. A sintered magnet was manufactured by a method similar to that of Example 5.

The major composition of the powder measured by use of a X-ray fluorescence analyzer and an ICP analyzer was as follows: Nd: 12.4 at. %; Dy: 0.6 at. %; B: 6.0 at. %; Al: 0.7 at. %; and Fe: balance.

The properties of the magnet were as follows: Br: 1.34 T; iHc: 1154 kA/m; and (BH)max: 332 kJ/m$^3$.

The conceivable reason for this is as follows. Since a large number of powder particles which are not single crystals; i.e., which have grain boundaries, are contained, the degree of preferred orientation was impaired.

The results reveals that the smaller crystal grain size has brought about remanence and magnetic energy product inferior to those of Example 1.

Example 6

Elemental neodymium, elemental dysprosium, ferroboron, aluminum, electrolytic cobalt, copper, and electrolytic iron were weighed and mixed so as to obtain the following composition: Nd: 16.8 at. %; Dy: 5.7 at. %; B: 6.8 at. %; Al: 0.8 at. %; Co: 3.1 at. %; Cu: 0.6 at. %; and a balance of Fe. The resulting mixture was melted in an alumina crucible in an argon gas atmosphere by use of a high-frequency induction melting furnace. The resulting molten mixture was subjected to casting by use of an iron box-mold, thereby producing an ingot having a thickness of 30 mm.

This ingot was coarsely crushed into fragments having a size of not greater than 5 mm for use as a boundary-phase alloy. The ingot of Example 2 was coarsely crushed into fragments having a size of not greater than 5 mm for use as a main-phase alloy. Subsequently, the main-phase alloy fragments and the boundary-phase fragments were blended at the weight ratio 80:20. The resulting mixture was subjected hydrogen decrepitation, crushing by use of a Brown mill in a nitrogen gas atmosphere, and pulverization by a jet mill in nitrogen gas. The resulting powder was sufficiently blended by use of a V-type blender in nitrogen gas, thereby obtaining a powder having a particle size of 3.2 μm as determined by FSSS. Notably, before crushing by use of the Brown mill, a zinc stearate powder serving as lubricant was added in an amount of 0.07 wt. %.

The major composition of the blended powder measured by use of an X-ray fluorescence analyzer and an ICP analyzer was as follows: Nd: 13.0 at. %; Dy: 1.0 at. %; B: 6.1 at. %; Al: 0.7 at. %; Co: 0.6 at. %; Cu: 0.1 at. %; and Fe: balance.

The blended powder was compacted at a pressure of 1 t/cm$^2$ in a magnetic field of 1.5 T. The resulting compact was sintered at 1050° C. in a vacuum for 4 hours. The resulting sintered body was heat-treated at 520° C. for one hour. The heat-treated sintered body was machined to a sintered magnet assuming the form of a 20 mm cube.

The magnetic properties of the sintered magnet measured by use of a BH curve tracer revealed that the sintered magnet had the following properties: Br: 1.32 T; iHc: 1321 kA/m; and (BH)max: 330 kJ/m$^3$. Thus, a magnet of excellent magnetic properties was obtained.

Example 7

Elemental neodymium, elemental dysprosium, aluminum, electrolytic cobalt, copper, and electrolytic iron were weighed and mixed so as to obtain the following composition: Nd: 34.0 at. %; Dy: 4.2 at. %; Al: 7.5 at. %; Co: 5.7 at. %; Cu: 1.1 at. %; and a balance of Fe. The resulting mixture was subjected to centrifugal casting by use of the casting apparatus of Comparative Example 1 under the same conditions as those of Comparative Example 1, thereby obtaining an ingot having a thickness of 8 mm.

This ingot was coarsely crushed into fragments having a size of not greater than 5 mm for use as a boundary-phase alloy. The ingot of Example 4 was coarsely crushed into fragments having a size of not greater than 5 mm for use as a main-phase alloy. Subsequently, the main-phase alloy fragments and the boundary-phase fragments were weighed and mixed at the weight ratio 87:13. The resulting mixture was subjected hydrogen decrepitation, crushing by use of a Brown mill in a nitrogen gas atmosphere, and pulverization by a jet mill in nitrogen gas. The resulting powder was sufficiently blended by use of a V-type blender in nitrogen gas, thereby obtaining a powder having a particle size of 3.2 µm as determined by FSSS. Notably, before crushing by use of the Brown mill, a zinc stearate powder serving as lubricant was added in an amount of 0.07 wt. %.

The major composition of the weighed and mixed powder measured by use of a X-ray fluorescence analyzer and an ICP analyzer was as follows: Nd: 13.4 at. %; Dy: 0.4 at. %; B: 6.0 at. %; Al: 0.7 at. %; Co: 0.5 at. %; Cu: 0.1 at. %; and Fe: balance. The blended powder was compacted at a pressure of 1 t/cm$^2$ in a magnetic field of 1.5 T. The resulting compact was sintered at 1080° C. in a vacuum for 4 hours. The resulting sintered body was heat-treated at 520° C. for one hour. The heat-treated sintered body was machined to a sintered magnet assuming the form of a 20 mm cube.

The magnetic properties of the sintered magnet measured by use of a BH curve tracer revealed that the sintered magnet had the following properties: Br: 1.35 T; iHc: 1050 kA/m; and (BH)max: 343 kJ/m$^3$. Thus, a magnet of excellent magnetic properties was obtained.

Comparative Example 7

The alloy ingot cast in Comparative Example 4 was used as a main-phase alloy, and the alloy ingot cast by the centrifugal casting method of Example 7 was used as a boundary-phase alloy. These alloys were subjected to blending and pulverization conducted by methods similar to those of Example 7.

The major composition of the blended powder measured by use of an X-ray fluorescence analyzer and an ICP analyzer was as follows: Nd: 13.8 at. %; Dy: 0.4 at. %; B: 6.1 at. %; Al: 0.7 at. %; Co: 0.5 at. %; Cu: 0.1 at. %; and Fe: balance. A sintered magnet was produced from the blended powder by a method similar to that of Example 7.

The magnetic properties of the sintered magnet measured by use of a BH curve tracer revealed that the sintered magnet had the following properties: Br: 1.32 T; iHc: 1044 kA/m; and (BH)max: 321 kJ/m$^3$. Thus, a magnet of poor magnetic properties was obtained.

The conceivable reasons for this include the following: since a large amount of dendritic αFe generated in the alloy ingot is unlikely to be pulverized, a certain amount of dendritic αFe remained within the pulverizer, with a resultant shift, toward the high-TRE side, of the composition of a blended powder obtained through pulverization; and a large amount of dendritic αFe is also contained in the powder, thereby causing a disturbance of magnetic-field distribution within a die cavity during compaction in a magnetic field, with a resultant impairment in the degree of preferred orientation.

Example 8

La-rich mischmetal, Ce-rich mischmetal, electrolytic nickel, electrolytic cobalt, aluminum, and electrolytic manganese were weighed and mixed such that a hydrogen storage alloy had the following composition: La: 9.2 at. % (19.0% by mass); Ce: 4.5 at. % (9.4% by mass); Pr: 0.4 at. % (0.9% by mass); Nd: 1.3 at. % (2.8% by mass); Co: 8.5 at. % (7.5% by mass); Al: 11.9 at. % (4.8% by mass); Mn 8.8 at. %(7.2% by mass); and a balance of Ni. By use of the resulting mixture, casting was performed under the same conditions as those of Example 1 using the apparatus shown in FIG. 1.

When the microstructure of a cross section was observed, a segregation phase of high Mn concentration was not observed, indicating that the microstructure was uniform.

Comparative Example 8

Figure 5:
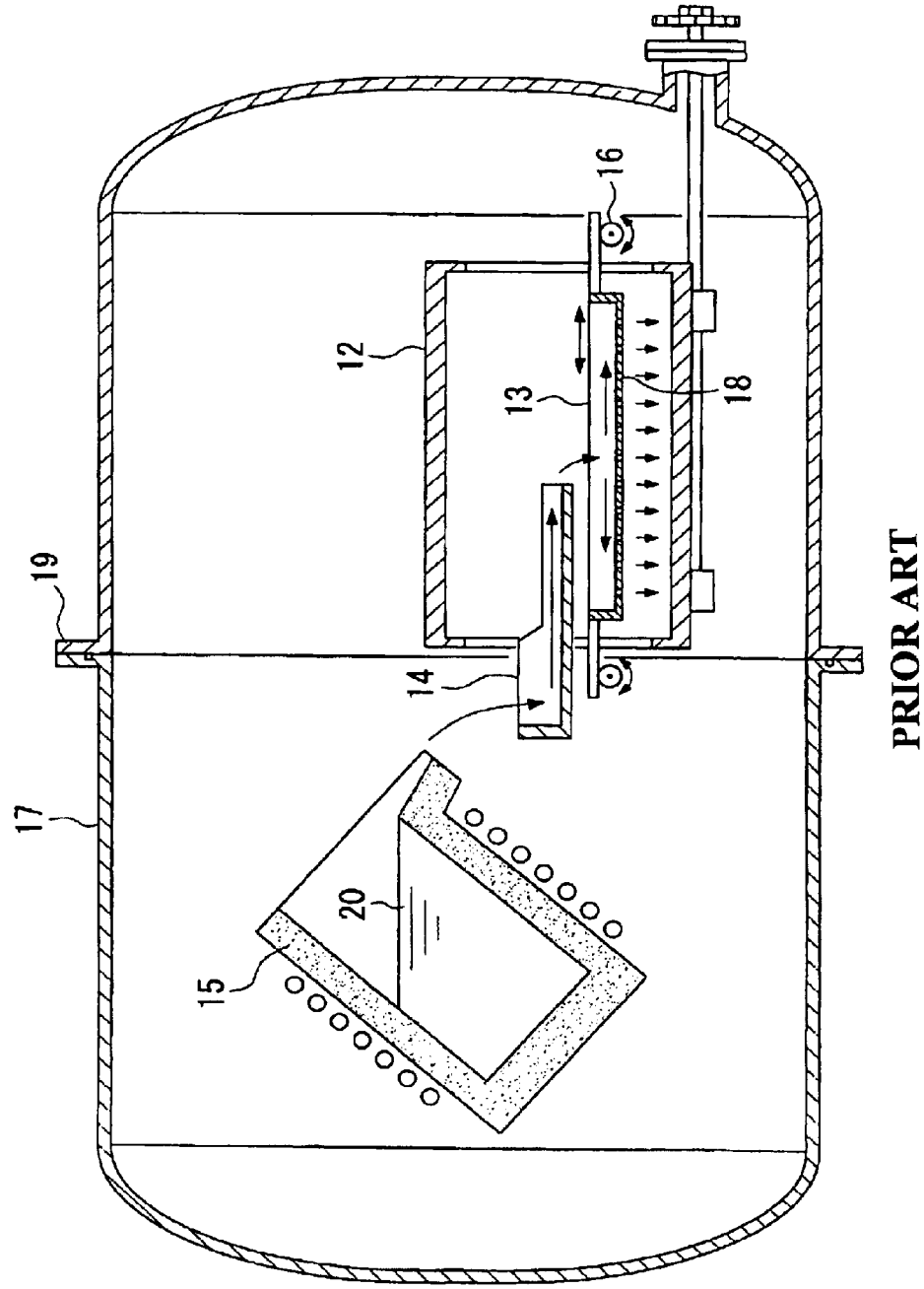
FIG. 5 is a longitudinal sectional view showing a conventional casting apparatus which employs the CC process.

An alloy of the same composition as that of Example 8 was cast under the same conditions as those of Comparative Example 1 by use of the conventional CC apparatus shown in FIG. 5.

When the microstructure of the cross section of an ingot was observed, a mesh Mn segregation phase was found to be formed all over the cross section, indicating that the microstructure was nonuniform.

Example 9

Elemental neodymium, ferroboron, electrolytic cobalt, gallium, ferrozirconium, and electrolytic iron were weighed and mixed so as to obtain the following composition: Nd: 12.6 at. % (28.1% by mass); B: 6.5 at. % (1.09% by mass); Co: 17.3 at. % (15.8% by mass); Ga: 0.3 at. % (0.32% by mass); Zr: 0.1 at. % (0.14% by mass); and a balance of iron. The casting apparatus of FIG. 1 was used for casting.

Casting conditions were similar to those of Example 1 except that the average molten-material deposition rate was 0.005 cm/sec and that the cylindrical mold was reciprocated along the axis of rotation L.

An obtained alloy ingot had a uniform thickness of about 10 mm. Almost the entire microstructure of the cross section of the alloy ingot, excluding only a small portion in the casting surface, was composed of columnar crystals. Observation of the sectional microstructure through a back scatterd electron microscope revealed that the dendritic αFe phase was completely absent. Measurement of the grain size by use of a polarization microscope revealed that grains having an average diameter of 83 µm as measured along a short axis and a diameter of not less than 1,000 µm as measured along a long axis occupied an area percentage of 88%, indicating that crystal grains have a size suited for use as material for an HDDR anisotropic bonded magnet alloy.

This cast product was crushed and then subjected to the HDDR treatment without involvement of annealing for homogenization. For HDDR, the temperature was increased from room temperature to 850° C. in a hydrogen atmosphere of 1 atm and maintained at 850° C. for two hours. Subsequently, while a temperature of 850° C. was maintained, a vacuum was established within a furnace and held for 30 minutes. Then, argon was introduced into the furnace, and the temperature was rapidly lowered to room temperature. The HDDR-treated powder was crushed to an average particle size of 200 μm by use of a disk mill. The obtained powder was mixed with 2.5% by mass of epoxy resin. The resulting mixture was compacted in a magnetic field at a pressure of 6 t/cm². Then, the resin was cured at 150° C. for one hour to thereby produce a bonded magnet.

Magnet properties as observed in the form of HDDR-treated powder were as follows: Br: 1.35T; iHc: 987 kA/m; and (BH)max: 319 kJ/m³. The properties of a bonded magnet formed from the powder were as follows: Br: 1.02 T; iHc: 955 kA/m; and (BH)max: 177 kJ/m³. Since the ingot assumes the optimum microstructure for production of an HDDR magnet, good magnetic properties were obtained even without involvement of annealing.

Example 10

Titanium, aluminum, and vanadium were weighed and mixed so as to obtained the following composition: Al: 6 at. %; V: 4 at. %; and a balance of Ti. Experiment was carried out by use of the apparatus shown in FIGS. 3 and 4. The mixture was melted in an arc melting furnace. The resulting molten material was formed into a columnar shape having a diameter of 5 cm, thereby obtaining the metal-containing material body 25. The thus-obtained columnar ingot was attached to the rotation drive mechanism 9. While a plasma arc of 75 kw was applied to the columnar ingot, the ingot was rotated at 1200 rpm. The axis of rotation L of the cylindrical mold 4 of copper having a diameter of 750 mm was arranged in a vertical direction and formed an angle of 20 degrees with respect to the axis of rotation R of the columnar ingot. The mold was rotated such that the inner wall of the mold assumes a peripheral velocity of 30 m/s.

Casting was performed by this method, thereby obtaining a ribbon-like ingot having a thickness of 60 μm.

INDUSTRIAL APPLICABILITY

The casting method of the present invention can avoid, among others, a drop in the temperature of a molten material during casting and attain a decrease in average deposition rate. Thus, the solidification-cooling rate in high-temperature region can be greatly increased.

According to the present invention, the angle of inclination θ formed by the axis of rotation R and the axis of rotation L of the cylindrical mold can be varied during deposition of a molten material, or the cylindrical mold can be reciprocated along the axis of rotation L during deposition of a molten material. Thus, the thickness of an ingot becomes uniform to a higher degree, and an alloy of excellent microstructure can be obtained.

The present invention can produce, for example, an R-T-B-type rare-earth magnet alloy free from formation of the dendritic αFe phase even when the TRE content is smaller than that in production by the strip casting method. Also, since the crystal grain diameter as measured along a long axis can be increased, there can be realized a casting method suited for producing high-performance magnet alloys and HDDR anisotropic bonded magnet alloys. Also, there can be provided an ingot of a high-melting-point metal, a typical example of which is Ti, an alloy or intermetallic compound which contains such a high-melting-point metal, or a mischmetal-transition-metal-type hydrogen storage alloy featuring a small amount of the Mn segregation phase, in contrast to a conventional method which has encountered difficulty in casting such materials.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A centrifugal casting method, comprising the steps of pouring a molten material onto a rotary body; sprinkling the molten material by the effect of rotation of the rotary body; and causing the sprinkled molten material to be deposited and to solidify on an inner surface of a rotating cylindrical mold, an axis of rotation R of the rotary body and an axis of rotation L of the cylindrical mold being caused not to run parallel to each other.

2. A centrifugal casting method as described in claim 1, wherein the rotary body assumes the form of a container having a bottom portion and a sidewall; the sidewall has a hole portion formed therein; and the molten material is poured into an opening portion of the container-like rotary body to thereby sprinkle the molten material through the hole portion.

3. A centrifugal casting method as described in claim 1, wherein the rotary body and the cylindrical mold rotate in the same direction.

4. A centrifugal casting method, comprising the steps of melting a metal-containing material body through application of heat while rotating the material body;

sprinkling the molten material by the effect of rotation; and causing the sprinkled molten material to be deposited and to solidity on an inner surface of a rotating cylindrical mold, an axis of rotation R of the metal-containing material body and an axis of rotation L of the cylindrical mold being caused not to run parallel to each other.

5. A centrifugal casting method as described in claim 4, wherein the metal-containing material body and the cylindrical mold rotate in the same direction.

6. A centrifugal casting method as described in claim 1, wherein the molten material is subjected to a force of not less than 1 G induced by rotation of the rotary body.

7. A centrifugal casting method as described in claim 4, wherein the molten material is subjected to a force of not less than 1 G induced by rotation of the metal-containing material body.

8. A centrifugal casting method as described in claim 1, wherein the molten material is subjected to a centrifugal force of not less than 3 G induced by rotation of the cylindrical mold.

9. A centrifugal casting method as described in claim 4, wherein the molten material is subjected to a centrifugal force of not less than 3 G induced by rotation of the cylindrical mold.

10. A centrifugal casting method as described in claim 1, wherein an angle of inclination θ formed by the axis of rotation R of the rotary body and the axis of rotation L of the cylindrical mold ranges from 5 degrees to 40 degrees.

11. A centrifugal casting method as described in claim 4, wherein an angle of inclination θ formed by the axis of rotation R of the metal-containing material body and the axis of rotation L of the cylindrical mold ranges from 5 degrees to 40 degrees.

12. A centrifugal casting method as described in claim 1, wherein when the molten material is caused to be deposited and to solidify on an inner wall of the cylindrical mold, average deposition rate is not greater than 0.015 cm/sec.

13. A centrifugal casting method as described in claim 4, wherein when the molten material is caused to be deposited and to solidify on an inner wall of the cylindrical mold, average deposition rate is not greater than 0.015 cm/sec.

14. A centrifugal casting method as described in claim 1, wherein when the molten material is caused to be deposited and to solidify on an inner wall of the cylindrical mold, average deposition rate is not greater than 0.010 cm/sec.

15. A centrifugal casting method as described in claim 4, wherein when the molten material is caused to be deposited and to solidify on an inner wall of the cylindrical mold, average deposition rate is not greater than 0.010 cm/sec.

16. A centrifugal casting method as described in claim 1, wherein when the molten material is caused to be deposited and to solidify on an inner wall of the cylindrical mold, average deposition rate is not greater than 0.005 cm/sec.

17. A centrifugal casting method as described in claim 4, wherein when the molten material is caused to be deposited and to solidify on an inner wall of the cylindrical mold, average deposition rate is not greater than 0.005 cm/sec.

18. A centrifugal casting method as described in claim 1, wherein when the molten material is deposited and solidifies on an inner wall of the cylindrical mold, the average surface temperature of an ingot is 0.4T to 0.8T, wherein T (K) is the solidification starting temperature of the molten material.

19. A centrifugal casting method as described in claim 4, wherein when the molten material is deposited and solidifies on an inner wall of the cylindrical mold, the average surface temperature of an ingot is 0.4T to 0.8T, wherein T (K) is the solidification starting temperature of the molten material.

20. A centrifugal casting apparatus, comprising a rotatable cylindrical mold; a rotary body disposed within the cylindrical mold; and a supply apparatus for pouring a molten material onto the rotary body,
    the rotary body being disposed such that an axis of rotation L of the cylindrical mold and an axis of rotation R of the rotary body do not run parallel to each other,
    the molten material poured onto the rotary body being sprinkled by the effect of rotation of the rotary body and being caused to be deposited and to solidify on an inner wall of the cylindrical mold.

21. A centrifugal casting apparatus, comprising a rotatable cylindrical mold; a rotation drive mechanism to which a metal-containing material body is attached such that at least an end of the metal-containing material body is located within the cylindrical mold and which is adapted to rotate the metal-containing material body; and a melting apparatus for melting the metal-containing material body through generation of arc or plasma arc,
    an axis of rotation L of the cylindrical mold and an axis of rotation R of the metal-containing material body being caused not to run parallel to each other,
    the molten metal-containing material being sprinkled by the effect of rotation of the metal-containing material body and being caused to be deposited and to solidify on an inner wall of the cylindrical mold.

22. A centrifugal casting apparatus as described in claim 20, wherein an angle of inclination θ formed by the axis of rotation L of the cylindrical mold and the axis of rotation R of the rotary body can be varied during deposition of the molten material.

23. A centrifugal casting apparatus as described in claim 21, wherein an angle of inclination θ formed by the axis of rotation L of the cylindrical mold and the axis of rotation R of the metal-containing material body can be varied during deposition of the molten material.

24. A centrifugal casting apparatus as described in claim 20, wherein the cylindrical mold and/or the rotary body can be reciprocated along the axis of rotation L during deposition of the molten material.

25. A centrifugal casting apparatus as described in claim 21, wherein the cylindrical mold and/or the metal-containing material body can be reciprocated along the axis of rotation L during deposition of the molten material.

26. A centrifugal casting method as described in claim 1, wherein an angle of inclination θ formed by the axis of rotation L of the cylindrical mold and the axis of rotation R of the rotary body is varied during deposition of the molten material.

27. A centrifugal casting method as described in claim 4, wherein an angle of inclination θ formed by the axis of rotation L of the cylindrical mold and the axis of rotation R of the metal-containing material body is varied during deposition of the molten material.

28. A centrifugal casting method as described in claim 1, wherein the cylindrical mold and/or the rotary body is reciprocated along the axis of rotation L during deposition of the molten material.

29. A centrifugal casting method as described in claim 4, wherein the cylindrical mold and/or the metal-containing material body is reciprocated along the axis of rotation L during deposition of the molten material.

30. A centrifugal casting method as described in claim 26, wherein the cylindrical mold and/or the rotary body is reciprocated along the axis of rotation L during deposition of the molten material.

31. A centrifugal casting method as described in claim 27, wherein the cylindrical mold and/or the metal-containing material body is reciprocated along the axis of rotation L during deposition of the molten material.

32. A centrifugal casting method as described in claim 1, wherein a rare-earth magnet alloy is cast.

33. A centrifugal casting method as described in claim 4, wherein a rare-earth magnet alloy is cast.

34. A centrifugal casting method as described in claim 32, wherein the rare-earth magnet alloy contains as rare-earth elements one or more elements selected from among Nd, Pr, and Dy.

35. A centrifugal casting method as described in claim 33, wherein the rare-earth magnet alloy contains as rare-earth elements one or more elements selected from among Nd, Pr, and Dy.

36. A centrifugal casting method as described in claim 34, wherein the rare-earth magnet alloy contains one or more elements selected from among Nd, Pr, and Dy in a total amount of 11.0 at. % to 15.2 at. %.

37. A centrifugal casting method as described in claim 35, wherein the rare-earth magnet alloy contains one or more elements selected from among Nd, Pr, and Dy in a total amount of 11.0 at. % to 15.2 at. %.

38. A centrifugal casting method as described in claim 34, wherein the rare-earth magnet alloy contains one or more elements selected from among Nd, Pr, and Dy in a total amount of 11.8 at. % to 14.4 at. %.

39. A centrifugal casting method as described in claim 35, wherein the rare-earth magnet alloy contains one or more elements selected from among Nd, Pr, and Dy in a total amount of 11.8 at. % to 14.4 at. %.

40. A centrifugal casting method as described in claim 34, wherein the rare-earth magnet alloy contains one or more elements selected from among Nd, Pr, and Dy in a total amount of 11.8 at. % to 13.5 at. %.

41. A centrifugal casting method as described in claim 35, wherein the rare-earth magnet alloy contains one or more elements selected from among Nd, Pr, and Dy in a total amount of 11.8 at. % to 13.5 at. %.

42. A centrifugal casting method as described in claim 32, wherein a rare-earth magnet alloy containing R-T-B (R: rare-earth elements including at least one element selected from among Nd, Pr, and Dy; and T: transition metals including Fe) is cast.

43. A centrifugal casting method as described in claim 33, wherein a rare-earth magnet alloy containing R-T-B (R: rare-earth elements including at least one element selected from among Nd, Pr, and Dy; and T: transition metals including Fe) is cast.

44. A method for producing a rare-earth magnet alloy, characterized by heat-treating, at a temperature ranging from 900° C. to 1,150° C., a rare-earth magnet alloy obtained through the centrifugal casting method as described in claim 32.

45. A method for producing a rare-earth magnet alloy, characterized by heat-treating, at a temperature ranging from 900° C. to 1,150° C., a rare-earth magnet alloy obtained through the centrifugal casting method as described in claim 33.

46. A method for producing a rare-earth magnet alloy powder, characterized by pulverizing a rare-earth magnet alloy obtained by the centrifugal casting method as described in claim 32 or by heat-treating the rare-earth magnet alloy at a temperature ranging from 900° C. to 1,150° C., followed by pulverization.

47. A method for producing a rare-earth magnet alloy powder, characterized by pulverizing a rare-earth magnet alloy obtained by the centrifugal casting method as described in claim 33 or by heat-treating the rare-earth magnet alloy at a temperature ranging from 900° C. to 1,150° C., followed by pulverization.

48. A centrifugal casting method as described in claim 1, wherein a rare-earth hydrogen storage alloy is cast.

49. A centrifugal casting method as described in claim 4, wherein a rare-earth hydrogen storage alloy is cast.

50. A centrifugal casting method as described in claim 48, wherein the rare-earth hydrogen storage alloy is a mischmetal-nickel alloy.

51. A centrifugal casting method as described in claim 49, wherein the rare-earth hydrogen storage alloy is a mischmetal-nickel alloy.

52. A centrifugal casting method as described in claim 1, wherein a metal, an alloy, or an intermetallic compound to be cast has a melting point or a solidification starting temperature of 1400° C. or higher.

53. A centrifugal casting method as described in claim 4, wherein a metal, an alloy, or an intermetallic compound to be cast has a melting point or a solidification starting temperature of 1400° C. or higher.

54. A centrifugal casting method as described in claim 52, wherein a metal, an alloy, or an intermetallic compound to be cast contains Ti.

55. A centrifugal casting method as described in claim 53, wherein a metal, an alloy, or an intermetallic compound to be cast contains Ti.

* * * * *